United States Patent
Takasaki et al.

(10) Patent No.: US 9,620,770 B2
(45) Date of Patent: Apr. 11, 2017

(54) NICKEL POSITIVE ELECTRODE FOR FIBER BATTERY

(75) Inventors: Tomoaki Takasaki, Akash (JP); Tetsuo Sakai, Ikeda (JP); Takashi Mukai, Ikeda (JP); Tsutomu Iwaki, Ikeda (JP); Kazuo Tsutsumi, Akashi (JP); Kazuya Nishimura, Akashi (JP)

(73) Assignees: NATIONAL INSTITUTE OF ADVANCED INDUSTRIAL SCIENCE AND TECHNOLOGY, Tokyo (JP); KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 1635 days.

(21) Appl. No.: 13/130,000

(22) PCT Filed: Nov. 18, 2009

(86) PCT No.: PCT/JP2009/006205
§ 371 (c)(1),
(2), (4) Date: Aug. 5, 2011

(87) PCT Pub. No.: WO2010/058574
PCT Pub. Date: May 27, 2010

(65) Prior Publication Data
US 2011/0287320 A1    Nov. 24, 2011

(30) Foreign Application Priority Data
Nov. 19, 2008  (JP) ................................. 2008-295906

(51) Int. Cl.
H01M 4/00 (2006.01)
H01M 4/32 (2006.01)
(Continued)

(52) U.S. Cl.
CPC ............... *H01M 4/32* (2013.01); *H01M 4/29* (2013.01); *H01M 4/663* (2013.01); *H01M 10/30* (2013.01)

(58) Field of Classification Search
CPC .......... H01M 4/32; H01M 4/29; H01M 4/663; H01M 10/30; Y02E 60/124
See application file for complete search history.

(56) References Cited

U.S. PATENT DOCUMENTS 5,017,274 A * 5/1991 Kerr .................... C01B 13/0244
204/233
6,193,871 B1   2/2001 Coates et al.
(Continued)

FOREIGN PATENT DOCUMENTS

CN    1291798 A    4/2001
EP    0 848 439 A1    6/1998
(Continued)

OTHER PUBLICATIONS

Extended European Search Report for Application No. 09827355.0, dated Nov. 6, 2013.
(Continued)

*Primary Examiner* — Raymond Alejandro
(74) *Attorney, Agent, or Firm* — Marshall, Gerstein & Borun LLP

(57) ABSTRACT

Disclosed is a nickel positive electrode for a fiber battery having a long life duration, and also being enabling a high output and high capacity to be attained. For this purpose, the nickel positive electrode for a fiber battery is obtained by coating a carbon fiber with nickel, then causing a cathodic polarization in a nickel nitrate bath using the nickel-coated carbon fiber as a cathode, and then immersing the precipi-
(Continued)

tate, which was deposited on the surface of the carbon fiber by the cathodic polarization, in an aqueous caustic alkali solution.

6 Claims, 17 Drawing Sheets

(51) Int. Cl.
  *H01M 4/29* (2006.01)
  *H01M 4/66* (2006.01)
  *H01M 10/30* (2006.01)

(56) References Cited

U.S. PATENT DOCUMENTS

2006/0024583 A1* 2/2006 Singh .................. H01M 4/0416
                                                                    429/245
2007/0243456 A1   10/2007 Ahn et al.

FOREIGN PATENT DOCUMENTS

| JP | 62-69465 | 3/1987 |
| JP | 06-196161 | 7/1994 |
| JP | 08-227726 | 9/1996 |
| JP | 08-264203 | 10/1996 |
| JP | 09-283136 | 10/1997 |
| JP | 10-334899 | 12/1998 |
| JP | 2000-277104 | 10/2000 |
| JP | 2001-110445 | 4/2001 |
| JP | 2003-317794 | 11/2003 |
| JP | 2004-022332 A | 1/2004 |
| JP | 2005-050580 | 2/2005 |
| JP | 2005-327564 | 11/2005 |
| JP | 2006-054084 | 2/2006 |
| JP | 2007-533098 | 11/2007 |
| KR | 1998-046933 | 9/1998 |
| KR | 10-2005-0099903 | 10/2005 |

OTHER PUBLICATIONS

Morishita et al., "Structural Analysis by Synchrotron XRD and XAFS for Manganese-Substituted α- and βType Nickel Hydroxide Electrode," Journal of the Electrochemical Society, 155 (12) A936-A944, 2008.

International Search Report for PCT/JP2009/006205, mailed Feb. 16, 2010.

* cited by examiner

NICKEL POSITIVE ELECTRODE FOR FIBER BATTERY

TECHNICAL FIELD

The present invention relates to a nickel positive electrode for a fiber battery provided with a fibrous electricity collector.

The nickel positive electrode of the present invention intends for a nickel positive electrode for a secondary battery that employs an aqueous solution as an electrolyte solution, and specifically, intends for a nickel positive electrode for a nickel-hydrogen battery or a nickel-cadmium battery, and the like, and is applicable also as a nickel positive electrode for a nickel-iron battery or a nickel-zinc battery, and the like.

These batteries serve as an electric power supply for portable use, stationary use, carrying use, and the like; however, according to the present invention, for example, electric power supplies for standby use and mobile use are principally intended, which are used under conditions in which the battery is neither charged nor discharged completely.

BACKGROUND ART

Currently, secondary batteries that employ a general aqueous solution as an electrolyte solution are configured with a plate-like positive electrode, a separator, and a similarly plate-like negative electrode. Alkali secondary batteries are configured with an aqueous solution of potassium hydroxide, sodium hydroxide or the like containing lithium hydroxide as an electrolyte solution, whereas lead storage batteries are configured using diluted sulfuric acid.

Batteries generally have a square-type shape including a plate-like shape, and a cylinder-type shape including a coin-like shape. In the former square type batteries, positive electrodes and negative electrodes are alternately arranged with separators interposed therebetween, and these electrodes are lead out collectively, as a positive electrode terminal, and a negative electrode terminal, respectively. Many of the alkali secondary batteries are of a cylinder type, and a group of electrodes consisting of a positive electrode, a separator and a negative electrode is coiled and inserted into an electrolytic bath. The lid and the can are insulated, and each is employed as a positive electrode terminal, and a negative electrode terminal. In addition, alkali secondary batteries of the square type have also prevailed.

As electrodes in alkali secondary batteries such as nickel-cadmium batteries and nickel-hydrogen batteries which have been broadly prevailing, electrodes having a comparatively great thickness of about 0.65 to 0.8 mm are used for providing high capacity, whereas electrodes having a smaller thickness of about 0.4 to 0.6 mm are used for providing high output.

In addition, with respect to electrodes of these alkali secondary batteries, electrodes of sintered type and of foamed nickel type have been well known as positive electrodes, whereas electrodes of paste type provided by applying a paste containing an active material to an electricity collector having a secondary structure such as a punching metal, followed by compression are principally adopted as negative electrodes.

As electricity collectors of positive electrodes, those of sintered type are sintered compacts obtained by sintering nickel carbonyl on a punching metal or the like, whereas those of foamed nickel type are porous bodies obtained by nickel plating on a foamed resin, followed by removing the resin by incineration. In addition, a number of porous bodies having irregularity formed by a mechanical processing have been proposed; however, they have not developed a practical level.

As a separator in alkali secondary batteries, a nonwoven fabric made of polyamide, and a hydrophilized polyolefin based nonwoven fabric predominantly having a thickness of about 80 to 200 µm have prevailed. In lead storage batteries, a paper, porous polyolefin plate or glass fiber cloth is used, and generally, it is necessary that it is impregnated in a large amount of sulfuric acid which directly involves in a charge and discharge reaction. Thus, a porous body which is thicker than those for use in alkali secondary batteries is used.

Moreover, a fiber battery having a battery structure that is different from a group of electrodes including a conventional positive electrode, a separator and a negative electrode, and is configured using as an electricity collector a fibrous substance having electronic conductivity (carbon fiber) coated with an active material on the surface thereof was proposed (see Patent Literature 1).

In addition, a method of processing an electric apparatus for avoiding occurrence of problems of short of storage batteries, capacitors and the like was proposed in which a group of first fiber electrodes are disposed on a first layer so as to be parallel with one another and a group of second fiber electrodes are disposed on a second layer so as to be parallel with one another, and then the second layer is brought into immediately adjacent to the first layer to form an electric connection between electrodes (see Patent Literature 2).

Also, a battery was proposed which includes: a plurality of fiber anodes: a plurality of fiber cathodes; an electrolyte; a sealing case for sealing in the transverse direction of the fiber anodes, the fiber cathodes and the electrolyte; and end plates for sealing both ends of the sealing case for sealing in the transverse direction, in which the ends of the fiber anodes are extended from the end plate to protrude, and the ends of the fiber cathodes are also extended from the end plate (see Patent Literature 3). According to this battery, a battery having a large electrode surface area is easily produced; therefore, charging capacity per volume of the battery can reportedly increase.

Furthermore, a cord type battery was proposed in which: either one of electrode materials, which is a long negative electrode material or a positive electrode material, provided by forming an electrode active material on the outer periphery of each electrode is employed as a core material; another electrode material is provided concentrically on the outer periphery thereof via a polymer solid electrolyte; and these are packaged with a covering material to configure a cord shape having flexibility in its entirety (see Patent Literature 4). The configuration of this battery is basically the same as generalized Leclanche type dry cells. In other words, dry cells are provided with a positive electrode material at the center, a negative electrode material at the peripheral part, and an electrolyte therebetween to form a cylinder shape.

On the other hand, with respect to an electrolytic deposition method that is a method of filling a nickel electrode with an active material which relates to the nickel electrode of the present application, a method of filling a sintered type nickel electrode with an active material was proposed. For example, in an attempt to obtain a nickel electrode having a low reaction resistance and small polarization on the positive electrode side, which does not accompanied by lowering of the capacity in an early stage, and achieves superior reliability at high temperatures and sufficient prolonging of life duration, Patent Literature 5 discloses a nickel electrode for a battery in which a porous metal substrate such as a sintered nickel substrate is filled with nickel hydroxide obtained by an electrolytic deposition method as a part of the total amount of the active material required, and filled with nickel hydroxide obtained by a chemical impregnation method in a predominant quantity of the total amount of the active material required.

CITATION LIST

Patent Literature

[PTL 1] Japanese Patent Laid-Open Publication No. 2003-317794
[PTL 2] Japanese Patent Laid-Open Publication No. Hei8-227726
[PTL 3] Japanese Patent Laid-Open Publication No. Hei8-264203
[PTL 4] Japanese Patent Laid-Open Publication No. 2001-110445
[PTL 5] Japanese Patent Laid-Open Publication No. Hei9-283136

SUMMARY OF INVENTION

Technical Problem

According to conventional plate-like electrodes, when the thickness is reduced, it is necessary to overlay a large number of electrodes in square type structures, whereas it is necessary to increase the length of the electrode and coil it in the case of cylinder type structures. Also in these respects, there has been a limitation in increasing the output. For example, in nickel-hydrogen batteries and nickel-cadmium batteries, the thickness of the nickel electrode should be about 400 μm at the smallest, and it is difficult to attain a higher output since diffusion of ions and/or electrons in the active material by moving around is rate-limiting.

Patent Literature 1 discloses a fiber battery.

Patent Literatures 2, 3 and 4 do not disclose in connection with an alkali nickel positive electrode for a secondary battery intended by the present invention.

Patent Literature 5 merely discloses a method of filling with an active material of a sintered type nickel electrode.

The present invention was made in view of the foregoing problems in prior arts, and an object of the invention is to provide a nickel positive electrode for a fiber battery that enables a high output and a high capacity, in addition to long life duration.

Solution to Problem

In order to achieve the object described above, the nickel positive electrode for a fiber battery of the present invention is characterized by being obtained by charging a fibrous electrode comprising an active material layer of β-Ni(OH)2 formed on the surface of a carbon fiber, thereby forming an active material layer of β-NOOH on the surface of the carbon fiber.

Furthermore, the nickel positive electrode for a fiber battery of the present invention is characterized by being obtained by further charging the nickel positive electrode for the fiber battery to change β-NiOOH into γ-NiOOH in the vicinity of the carbon fiber, whereas the external side of the active material layer of the γ-NiOOH is maintained as having the structure of β-NiOOH.

Moreover, the nickel positive electrode for a fiber battery of the present invention is characterized by being obtained by charging a fibrous electrode comprising an active material layer of α-Ni(OH)2 formed on the surface of a carbon fiber, thereby changing the entirety of the surface of the carbon fiber into γ-NiOOH.

It is preferred that the active material layer comprises a normal phase and a fault phase, and the rate of the fault phase is 25 to 50%.

Additionally, the nickel positive electrode for a fiber battery of the present invention is characterized by being obtained by a process comprising: coating nickel on a carbon fiber; then permitting cathodic polarization using the nickel-coated carbon fiber as a cathode in a nickel nitrate bath; and thereafter immersing in an aqueous caustic alkali solution the precipitate deposited on the surface of the carbon fiber by the cathodic polarization.

A monofilament configuring the carbon fiber preferably has a diameter of 5 to 100 μm.

The carbon fiber preferably has a state of a bundle formed with 1,000 to 20,000 monofilaments.

The carbon fiber preferably has a state in which 2 to 10 monofilaments are twisted.

The nickel coat layer preferably has a thickness of 0.5 to 15 μm.

The step of coating nickel preferably comprises electroless nickel plating, followed by electrolytic nickel plating.

The precipitate deposited on the surface of the carbon fiber coated with nickel by immersing in the aqueous caustic alkali solution is preferably configured with a layer of crystalline nickel hydroxide.

The crystalline nickel hydroxide layer preferably has a thickness of 0.5 to 30 μm concentrically.

A cobalt salt is preferably contained in the nickel nitrate bath.

At least one salt of a bivalent metal other than a nickel ion is preferably included in the nickel nitrate bath.

An aluminum salt or a manganese salt is preferably contained in the nickel nitrate bath.

The cathodic polarization is preferably carried out in the nickel nitrate bath containing as the conductant agent metal powders or a carbon-containing substance.

The cathodic polarization is preferably carried out in the nickel nitrate bath containing a binder.

Advantageous Effects of Invention

According to the nickel positive electrode for a fiber battery of the present invention, when used as a positive electrode of a secondary battery, a high output and a high capacity can be achieved in addition to long life duration.

BRIEF DESCRIPTION OF DRAWINGS

FIG. 6 (*a*) shows the SEM photograph when the electrolytic deposition time is 15 min (2,000 times); FIG. 6 (*b*) shows the SEM photograph when the electrolytic deposition time is 30 min (2,000 times); FIG. 6 (*c*) shows the SEM photograph when the electrolytic deposition time is 60 min (5,000 times).

FIG. 9 (*a*) shows a view illustrating an X-ray diffraction pattern after an immersion treatment with an aqueous alkali solution; FIG. 9 (*b*) shows a view illustrating an X-ray diffraction pattern after charging 110% (provided that one-electron reaction accounts for 100%); FIG. 9 (*c*) shows a view illustrating an X-ray diffraction pattern after discharging. The measurement conditions involved CuKα-ray, and λ (wavelength of X-ray) was 1.54056 Å.

FIG. 10 (*a*) shows a view illustrating an X-ray diffraction pattern and results of structural analysis after an immersion treatment with an aqueous alkali solution; FIG. 10 (*b*) shows a view illustrating an X-ray diffraction pattern and results of structural analysis after charging; and FIG. 10 (*c*) shows a view illustrating an X-ray diffraction pattern and results of structural analysis after discharging. The measurement conditions involved BL19B2 at SPring-8, and λ is 0.7 Å.

FIG. 12 (*a*) shows a view illustrating an X-ray diffraction pattern after an immersion treatment with an aqueous alkali solution; FIG. 12 (*b*) shows a view illustrating an X-ray diffraction pattern after charging; and FIG. 12 (*c*) shows a view illustrating an X-ray diffraction pattern after discharging. The measurement conditions involved a CuKα-ray, and λ was 1.54056 Å.

FIG. 14 shows a view illustrating discharge curves at 1 C-rate after 110% charging at 1 C-rate for Examples 1 to 4 (electrodes A to D) and Reference Example (electrode E).

FIG. 15 shows a view illustrating a discharge curve at 1 to 500 C-rate after 110% charging at 1 C-rate for Example 1 (electrode A).

DESCRIPTION OF EMBODIMENTS

Although the diameter of the carbon fiber used in the present invention (including graphite fiber) is not particularly limited, when used as an electricity collector, the thickness of generally used electricity collectors of nickel positive electrodes may be considered as a standard thickness. Specifically, electricity collectors of sintered type or foamed nickel positive electrodes has a thickness of not less than 400 μm, and thus the diameter according to the present invention is preferably considerably smaller than such a thickness. In these regards, the diameter of the monofilament configuring the carbon fiber is preferably 5 to 100 μm, and more preferably 5 to 50 μm.

Figure 1:
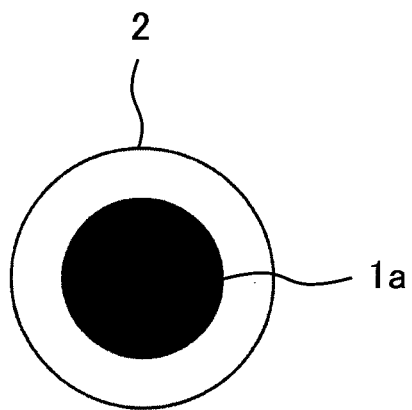
FIG. 1 shows a schematic view illustrating the state of a carbon fiber having a large curvature (i.e., having a small radius) on which nickel hydroxide was electrolytically deposited.
Figure 2:
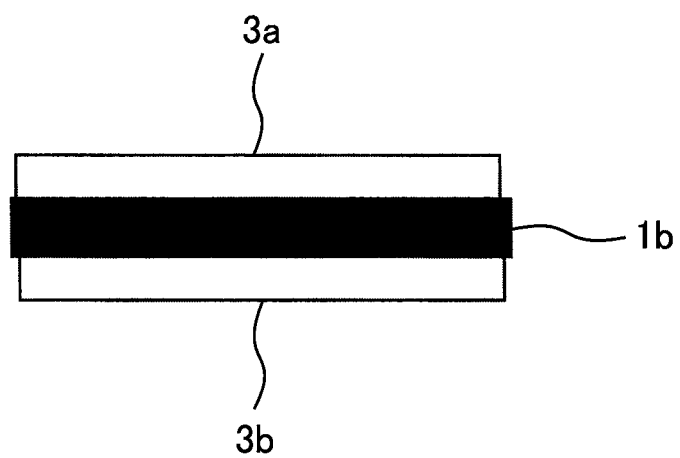
FIG. 2 shows a schematic view illustrating the state of a conventional plate-like substrate on which nickel hydroxide was electrolytically deposited.

When the diameter of the monofilament is as small as less than 5 μm, the mechanical strength may be insufficient, and thus the monofilaments may be broken due to the constriction when bundled with a crimping terminal, and the weight of the deposited active material. In addition, due to a small diameter, the electric conductivity may be lowered, and uniform deposition of the active material may be difficult. On the other hand, when the monofilament has a large diameter to exceed 100 μm, the active material deposited on the monofilament is likely to be detached and dropped off, and the cycle life on charge and discharge may be also likely to be deteriorated. This event relates to a curvature of the lateral face of the carbon fiber. Originally, nickel hydroxide has a property to grow into spherical crystals. It is believed that a plurality of spherical crystal cores of nickel hydroxide are electrolytically deposited on carbon fibers, and link with one another to grow cylindrically. As shown in FIG. 1, on monofilament 1*a* having a large curvature (i.e., having a small radius), nickel hydroxide crystals 2 deposited on circumferential direction are likely to link and form a cylindrical shape, and thus it is believe that detachment is less likely to occur even if crystallization of nickel hydroxide, and change in volume accompanying with charge and discharge are caused. On the other hand, as shown in FIG. 2, nickel hydroxide 3*a* deposited on the upper face side of a conventional flat platy substrate 1*b* (in the case in which the curvature is very small) configured with nickel, and nickel hydroxide 3*b* deposited on the under face side of the plate-like substrate 1*b* do not link one another. Thus it is believed that detachment and dropping off are likely to occur if crystallization of nickel hydroxide and/or change in volume accompanied by charge and discharge are caused. In fact, according to many findings by the present inventor, an active material electrolytically deposited on a smooth flat plate is almost completely dropped off due to not only charge and discharge but change in volume accompanied by crystallization of nickel hydroxide that occurs upon a caustic alkali immersion treatment. In this regard, when the monofilament has a diameter in the range of 5 to 100 μm, superior contact properties are exhibited as the electrolytic deposition allows the active material to be cylindrically deposited on the surface of the monofilament, and easy detachment can be prevented even if swollen or contracted owing to charge and discharge. Accordingly, 2,000 cycles or more charge and discharge are enabled.

The carbon fiber employed may be a monofilament, or an aggregate of a plurality of monofilaments is also efficacious. When aggregated, 1,000 to 20,000 monofilaments are preferably used to form a single bundle, and 2,000 to 6,000 monofilaments are more preferably used to form a single bundle. By fixing one end of this bundle of the fibers with a crimping terminal or the like, one electrode is formed.

In addition, forming one carbon fiber in which 2 to 10 monofilaments are twisted is also efficacious, and it is more preferred to form an electrode by bundling twisted yarns provided by twisting such carbon fibers. As described later, the electrolytic deposition utilizes an event of reduction of nitric acid ions in a nickel nitrate bath around the electricity collector by electrolysis to turn into ammonium ions, whereby the pH shifts alkaline to permit precipitation of nickel hydroxide. Therefore, the state in which 1,000 or more carbon fibers are bundled is more preferred since nickel hydroxide can be uniformly deposited among fibers where transfer of the solution can be suppressed. When the number of fibers is less than 1,000, the solution among fibers diffuses so fast that efficiency of electrolytic deposition may be deteriorated. On the other hand, when the number of monofilaments bundled is increased to 20,000, the diameter of the cross section will be about 10 mm. When the diameter exceeds this value, diffusion of a plating solution is remarkably inhibited inside the fiber bundle; therefore, the thickness of the electrolytic deposition tends to be nonuniform. In particular, thick electrolytic deposits accumulate inside the fiber bundle where transfer of the solution can be suppressed, whereby a region in which sufficient power collection fails is likely to be generated, leading to deterioration of the utilization efficiency. According to these circumstances, the number of fibers is preferably 1,000 to 20,000, and more preferably 2,000 to 6,000 for allowing nickel hydroxide to be uniformly deposited on each fiber.

Since carbon fibers without being modified are hydrophobic, electrolytic deposition is enabled by subjecting to a hydrophilizing treatment using a surfactant. However, since only such a treatment results in insufficient electric conductivity, the electrolytic deposits are deposited nonuniformly among fibers. Thus, as shown in the following Examples 1 to 4 and Reference Examples, upon uniform nickel coating on each fiber, an active material layer having a concentrically uniform thickness was successively formed on each fiber. The basis for this event relates to electric conductivity of the fiber surface. Although electric resistivity of carbon fibers is about $4 \times 10^{-7}$ $\Omega$m, it is changed to $6 \times 10^{-8}$ $\Omega$m by subjecting to nickel coating, whereby the electric conductivity is elevated about 10 times. In other words, nickel coating leads to improvement of electric conductivity and hydrophilicity of the fiber surface, and thus electrolytic deposition of a uniform nickel hydroxide active material layer is enabled.

As a method of coating nickel on a carbon fiber, a method in which accumulation of nickel is permitted by electrolytic nickel plating, electroless nickel plating, thermal decomposition of nickel carbonyl, or the like may be adopted. As a method for uniformly coating nickel on each fiber of a bundle of 1,000 or more carbon fibers, a method in which an electroless nickel plating method is employed to permit thin nickel coating, and then an electrolytic nickel plating method is carried out is most suitable.

The electroless nickel plating is a process of depositing nickel metal by a chemical reductive action, and enables a film having a uniform film thickness to be formed even in the case of a bundle of carbon fibers having an insufficient electric conductivity, and a complicated and complex shape since electrification is not necessary. Therefore, if a thin nickel film is formed on the bundle of carbon fibers by electroless nickel plating prior to carrying out electrolytic nickel plating, it can be used as a substrate for forming a nickel plating layer having an even more uniform thickness. Moreover, since the electric conductivity of the surface of carbon fibers is elevated, efficiency of plating when electrolytic nickel plating is employed can be improved, and thus superior mass productivity can be realized.

Figure 3:
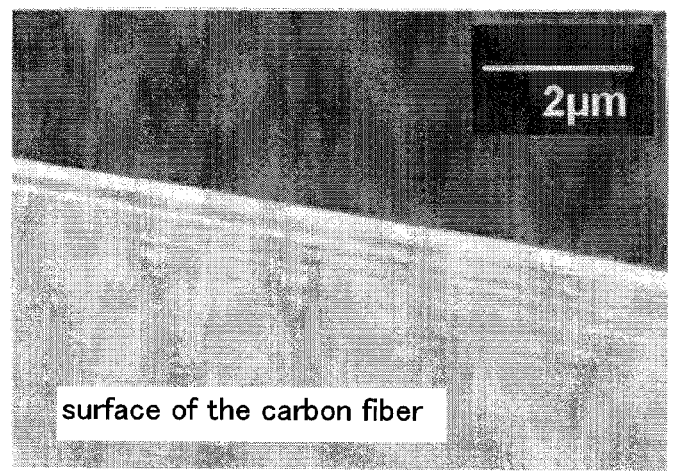
FIG. 3 shows a scanning electron microscopic (SEM) photograph (10,000 times) illustrating the surface of a carbon fiber.

The electroless nickel plating on carbon fibers may be carried out by a well-known nickel-phosphorus alloy plating (phosphorus content: 5 to 12%) deposition method in which a hypophosphorous acid salt is used as a reducing agent, or a nickel-boron alloy plating (boron content: 0.2 to 3%) deposition method in which a reductive action of dimethylamine borane is utilized. The thickness of the plating layer of electroless nickel plating of 0.1 to 0.5 µm is satisfactory. Next, electrolytic nickel plating on carbon fibers which had been subjected to electroless nickel plating may be carried out in a well-known Watts-type bath. The thickness of the plating layer involving electroless nickel plating and electrolytic nickel plating is preferably 0.5 to 15 µm, and more preferably 1 to 8 µm. When the thickness of the nickel plating layer is less than 0.5 µm, sufficient electric conductivity may not be attained. When the nickel plating layer has a thickness of 0.5 to 15 µm, sufficient electric conductivity can be attained, and nickel plating that reflects fine irregularity of the surface of carbon fibers as shown in FIG. 3 is enabled. When electrolytic deposits enter into this irregular portion, an effect of enhancing adhesiveness of the active material is achieved owing to an anchor effect. As the nickel plating layer is thicker, this irregularity decreases, and the nickel plating layer having a thickness of greater than 15 µm results in an almost smooth surface. In this case, adhesiveness of the active material is deteriorated. Accordingly, the plating layer involving electroless nickel plating and electrolytic nickel plating has a thickness of preferably 0.5 to 15 µm. Although commercially available nickel wires having a diameter of 30 to 100 µm were also studied in effect, deposited nickel hydroxide exhibited inferior cohesive force, and it was impossible to use as an electricity collector for electrodes of fiber batteries. Therefore, nickel plating that is porous and achieves an anchor effect and is capable of maintaining electric conductivity is efficacious, and an electricity collector for an electrode of a fiber battery that exerts superior functions can be formed by forming a nickel plating layer having a thickness of preferably 0.5 to 15 µm and more preferably 1 to 8 µm with on the surface of carbon fibers having fine irregularity with an electroless method, followed by an electrolytic method.

Next, electrolysis is carried out in a nickel nitrate bath using a carbon fiber as a cathode, and a nickel plate as an anode, whereby a substance almost corresponding to nickel hydroxide is electrolytically deposited (filling with active material).

Figure 4:
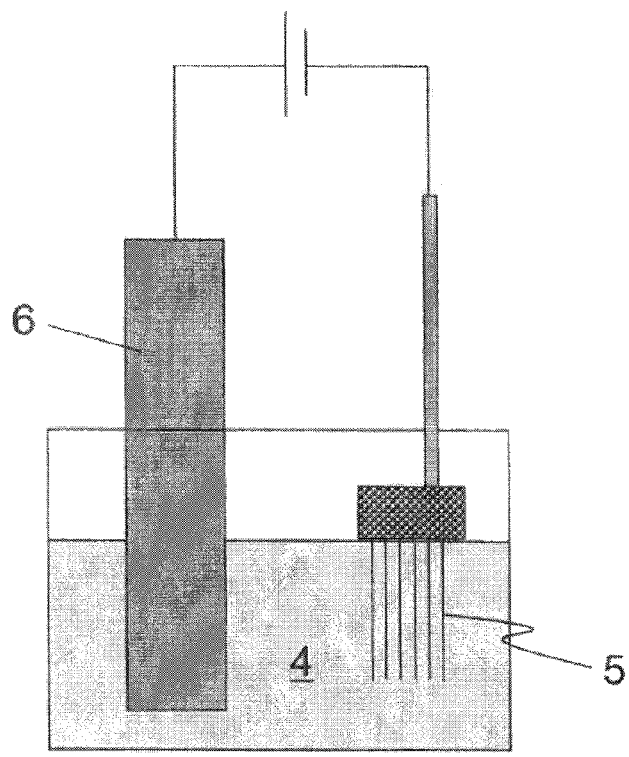
FIG. 4 shows a view illustrating a schematic configuration of an electrolytic deposition apparatus.

An electrolytic deposition apparatus which may be used in the aforementioned step of filling with an active material is shown in FIG. 4. In this apparatus, a fibrous electricity collector is disposed as a cathode 5, and a nickel plate is disposed as an anode 6 in an aqueous nickel nitrate solution 4. The concentration of the aqueous nickel nitrate solution used in electrolytic deposition is preferably 0.05 to 1.5 mol/L, and more preferably 0.3 to 1 mol/L. Electric current density during the electrolytic deposition is preferably 0.1 to 30 mA/cm2, and more preferably 1 to 20 mA/cm2. The deposited active material has a thickness of preferably 0.5 to 30 μm, and more preferably 5 to 15 μm. When the active material has a thickness of less than 0.5 μm, sufficient battery capacity may not be retained. On the other hand, when the active material has a thickness of beyond 30 μm, the active material layer will have a nonuniform thickness, and thus the active material may be likely to drop upon expansion of the active material accompanying with charge and discharge.

It should be noted that by dispersing a conductant agent in a plating bath to permit co-deposition plating of the conductant agent on the electricity collector of the carbon fibers when nickel hydroxide is formed (filling with active material), the electric conductivity of the produced active material is increased, and thus output characteristics can be further improved.

In addition, by dispersing a binder in a plating bath to permit co-deposition plating of the binder on the electricity collector of the carbon fibers when nickel hydroxide is formed (filling with active material), the binder plays a role in improving the adhesiveness of the active material, and thus improvement of output characteristics of the produced active material and cycle life is enabled. Therefore, by dispersing a conductant agent and a binder in a plating bath to permit co-deposition plating of the conductant agent and the binder on the electricity collector of the carbon fibers, further improvement of the electric conductivity of the produced active material, the output characteristic, and the cycle life is enabled.

As the binder, a fluorine based resin such as polytetrafluoroethylene (PTFE) is most suitable, and generally employed materials such as polyvinyl alcohol (PVA), polyethylene (PE), polypropylene (PP), styrene based copolymer and cellulose esters may be also used. It is to be noted that since PTFE has water repellency, it is preferably dispersed using a surfactant for permitting uniform dispersion. The surfactant is not particularly limited, and saponin, phospholipid, peptide, and Triton (manufactured by Union Carbide Corporation) may be used. The amount of the surfactant added is preferably about 0.01 to 3% by weight with respect to the weight of the nickel nitrate bath.

Among the binders, PTFE, PE and PP that are superior in alkaline resistance and oxidation resistance are preferred, and PTFE that is a fluorine based resin exhibits most preferable cycle life characteristics. It should be noted that when used under conditions in which the battery is not overcharged such as electric power supplies for use in emergency and electric power outage, the range of applicable resins can be expanded such as polyvinyl alcohol (PVA) and rubber based binders that are superior in binder performances.

The content of the binder with respect to the weigh of nickel nitrate in the nickel nitrate bath is preferably 0.5 to 20% by weight, and more preferably 1 to 10% by weight. In the case in which the binder is added, the effect of increasing retentivity of the active material can be achieved to meet the amount added; however, the binder added in an excess amount may result in elevation of electrode resistance of the positive electrode, leading to lowering of the high rate dischargeability.

The conductant agent may include metal powders, carbon black (acetylene black (AB), Ketjen black (KB), furnace black, etc.), a particulate carbon material, an electric conductivity polymer, and the like. The metal powder may be provided from a metal having alkaline resistance and oxidation resistance, and powders of Ni, Au, SUS or the like are preferred. It should be noted that due to having a great specific gravity, attention must be paid for allowing the metal powders to be favorably dispersed, and increase in the amount of the metal powders results in lowering of the energy density by weight of the obtained positive electrode. Therefore, the content of the metal powders with respect to the weigh of nickel nitrate in the nickel nitrate bath is preferably 1 to 5% by weight.

On the other hand, since carbon black, particulate carbon materials, electric conductivity polymers and the like have a small specific gravity, they are preferred in light of the energy density by weight; however, due to having inferior oxidation resistance, they are not suited for applications in which overcharging is carried out. In other words, the cause is believed to oxidation by oxygen gas generated upon overcharge of alkali secondary batteries. However, particulate carbon materials subjected to a high temperature treatment in vacuo are known to have special indistinguishable properties for both carbonaceous carbon materials and graphite carbon materials, are resistant to oxidation even upon overcharge, and can form a long life nickel electrode (see Japanese Patent Laid-Open Publication No. 2006-054084). Therefore, the particulate carbon materials thus obtained are suited for the conductant agent of the present application, and thus are preferable as a conductant agent due to having superior energy density by weight, and being resistant to oxidation upon overcharge.

More specifically, as one example of a method for producing a particulate carbon material that is superior in oxidation resistance, a method in which carbon black is subjected to a heat treatment enables it to be readily prepared. In this method, although the heat treatment temperature cannot be generally defined since it may dependent on factors such as types and properties of the particulate carbon material, it is preferably predetermined at 1,800 to 2,600° C. for 2 hrs, in general. The heat treatment time at this the temperature is preferably set at least 2 hrs, and more preferably 3 hrs or longer also it may vary depending on the size of the vessel used in the heat treatment. When the heat treatment time is shorter than 2 hrs, it becomes difficult to heat through uniformly, and to obtain a particulate carbon material that exhibits electrolytic durability may fail. The particulate carbon material obtained in this manner shows characteristic oxidation resistance different from those of carbonaceous carbon materials having a degree of graphitization (G-value) exceeding 0.8, and graphite carbon materials having a degree of graphitization (G-value) less than 0.3. It is to be noted that a specific degree of graphitization is to be exhibited with a preferable degree of graphitization (G-value) being 0.4 to 0.7.

The content of the conductive agent relative to the weight of nickel nitrate in a nickel nitrate bath is preferably 0.1 to 40% by weight, more preferably 1 to 30% by weight, and still more preferably 3 to 20% by weight. When the content of the conductant agent is less than 0.1% by weight, the effect achieved by addition of the conductant agent cannot be expected. When the content of the conductant agent is beyond 40% by weight, the active material layer is likely to drop, thereby leading to lowering of capacity of a fibrous nickel positive electrode. Thus, when the content of the conductive agent relative to the weight of nickel nitrate in the nickel nitrate bath is 0.1 to 40% by weight, sufficient effect of improving the electric conductivity is achieved, and lowering of the capacity of the positive electrode can be minimized. When a water repellent conductant agent, for example, carbon black is used, it may be dispersed with a stirrer, ultrasound or the like; however, a polymer and/or a surfactant may be further added to the plating solution since uniform dispersion may be difficult. In regard to the polymer and the surfactant effectively used in this case may be PVA, saponin, a phospholipid, peptide, Triton (manufactured by Union Carbide Corporation) and the like. Of these, PVA that serves also as a binder is preferred. In particular, it may be added together with an emulsified binder.

In the step described above, the active material of the nickel electrode (in a discharged state) is allowed to deposit, and a cobalt compound may be added thereto which is reportedly effective in improving utilization efficiency and life duration of the active material. In this procedure, a cobalt salt such as cobalt nitrate is added to the nickel nitrate bath at a molar ratio of preferably 0.5 to 10%, and more preferably 3 to 6% to permit electrolytic deposition, and thereafter immersion in an aqueous caustic alkali solution may be carried out.

For effective formation of the cobalt compound on the surface of the active material layer, after nickel hydroxide is allowed to deposit, immersion in an aqueous cobalt salt solution is carried out, and then immersion in an aqueous caustic alkali solution may be carried out. Furthermore, when heated in the air at preferably 80 to 120° C., and more preferably 90 to 110° C. in the state in which the caustic alkali is adhered, cobalt hydroxide is converted into cobalt oxyhydroxide, and an effect of preventing the positive electrode from reduction in the utilization efficiency is achieved.

In the step of deposition of the active material on the nickel electrode, substitution with a bivalent element (for example, Zn, mg, Ca, or Sr) may be carried out in an attempt to prolong life duration of the charge and discharge cycle of the active material. In an exemplary method for this procedure, at least one of zinc nitrate, magnesium nitrate, calcium nitrate and strontium nitrate may be added into the nickel nitrate bath at a molar ratio of preferably 2 to 20%, and more preferably 3 to 10% and electrolytical deposition is allowed, followed by immersion in an aqueous caustic alkali solution.

Nickel in nickel hydroxide has a valence changed from 2+ to 3+ upon charging, and additional charging results in additional partial change to 4+. As the charging proceeds, hydrogen that exists between layers of nickel hydroxide of the layered structure is ionized and consecutively released into the electrolyte solution. This event results in gradual decrease in binding force between layers, whereby expansion in the direction of lamination is caused. When a part of the nickel site is substituted with the aforementioned element (for example, Zn, mg, Ca, or Sr) which is not converted from bivalent to trivalent upon charging, release of hydrogen is prevented, and expansion in the direction of lamination is of the active material is suppressed. As a result, detachment or dropping can be suppressed, and thus prolonging of life duration of cycle characteristics is enabled. As a matter of course, when these elements are added in a too large amount, phase transition into a γ-NiOOH phase that exerts a high capacity is suppressed, and thus the utilization efficiency of the positive electrode is rather reduced to 80 to 90% as compared with the case in which any element was not added.

In the step of deposition of the active material on the nickel electrode, an aluminum compound or a manganese compound that is reportedly effective in attaining a higher capacity of the active materials may be also added herein. In an exemplary method for this procedure, an aluminum salt such as aluminum nitrate or a manganese salt such as manganese nitrate may be added into the nickel nitrate bath at a molar ratio of preferably 2 to 40%, and more preferably 5 to 30% and electrolytical deposition is allowed, followed by immersion in an aqueous caustic alkali solution.

In the foregoing, achieving long life duration as well as high capacity enabled by the nickel positive electrode for a fiber battery of the present application is described. According to the present invention, the amount of deposition of nickel hydroxide on a fibrous electricity collector can be easily controlled by changing the electric current density or time for the deposition. Thus produced nickel positive electrode for a fiber battery forms β-NiOOH by charging 100%, and further charging results in formation of γ-NiOOH. In addition, since the diameter of the fiber can be altered, a high output is enabled by decreasing the diameter of the electricity collector, and thinning the active material layer. It is to be noted that the characteristics such as high output and high capacity may be also improved by adding an additive ad libitum.

Furthermore, when electrolytic deposition is allowed using a nickel nitrate bath on a sintered nickel substrate formed from a porous metal, deposition efficiency of 20% or less is attained; however, it was revealed that the deposition efficiency attained when electrolytic deposition is allowed on an aggregate of the fibrous electricity collector increases about two times or greater in comparison with the former as demonstrated in the following Examples. In the case of sintered type, the electrolytic deposition is executed into the pores of the porous body, whereas deposition on the fiber and between fibers is executed according to the present invention. It is assumed that grounds for this event concerns conversion of nickel nitrate into ammonia, and deposition of nickel hydroxide that proceed more smoothly compared with those of sintered type.

EXAMPLES

Hereinafter, the present invention is explained in more detail by way of Examples, but the present invention is not limited to the following Examples.

Example 1

As graphite fibers (graphitized twist yarn produced using two strings of a commercially available polyacrylonitrile fiber) configuring an electricity collector, those having an average diameter of 12 μm were used. Each monofilament configuring this fiber has an average diameter of 6 μm.

After this graphite fiber is subjected to electroless nickel plating by a deposition method with nickel-boron alloy (boron: 1%) plating using a reductive action of dimethylamine borane, electrolytic nickel plating was carried out. The electrolytic nickel plating was carried out using a plating bath containing 350 g/L nickel sulfate, 45 g/L nickel chloride and 42 g/L boric acid as principal components, i.e., Watts-type bath, generally referred to. Specifically, 3,000 strings of graphite fiber having a length of 50 mm were sandwiched between two foamed nickel pieces and crimped to fix, and placed into Watts-type bath as a terminal. As a counter electrode, a nickel plate having a thickness of 2 mm was used. The surface of the fiber was subjected to nickel plating such that the plating layer including electroless plating and electrolytic plating had a thickness of 5 μm on average to obtain a fiber (fibrous) electricity collector. Plating conditions of the electrolytic plating involved an electric current density of 20 mA/cm2, and an electrification time of 10 min.

Subsequently, a solution for electrolytic deposition was prepared by adding 5,000 g of water to 2,100 g of nickel nitrate (hexahydrate), and adjusting the pH to 5. Electrolytic deposition was carried out in this solution with the aforementioned fibrous electricity collector as a cathode, the nickel plate as an anode, and a nonwoven polypropylene fabric as a separator provided between both electrodes. Electrolytic deposition conditions involved an electric current density of 20 mA/cm2, and an electrolytic deposition time of 6 min. Nickel hydroxide electrolytically deposited on the fibrous electricity collector had a thickness of 12 μm on average, and nickel hydroxide deposited to give a thickness of 15 μm also among monofilaments configuring the fibrous electricity collector. Electrodeposition efficiency of nickel hydroxide in this case was about 45%.

The fibrous electricity collector on which nickel hydroxide deposited was immersed in a 20% by weight aqueous sodium hydroxide solution at 60° C. for 1 hour. Next, washing with water and drying gave the nickel positive electrode for a fiber battery of the present invention. The packing density of the active material (nickel hydroxide) was 620 mAh/cc including the electricity collector. Thus obtained positive electrode is referred to as electrode A.

Figure 5:
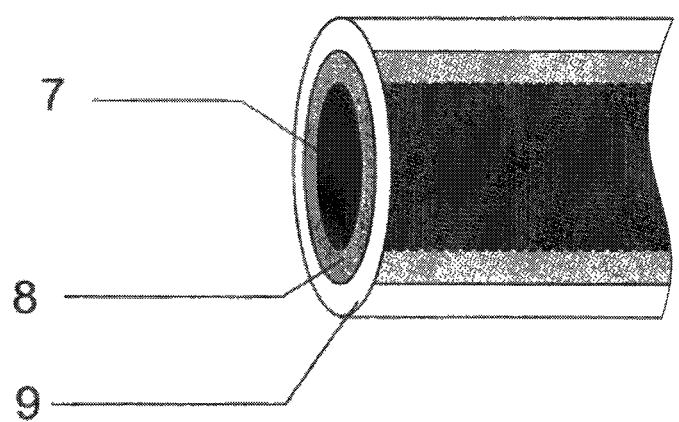
FIG. 5 shows a view illustrating a schematic structure of the nickel positive electrode for a fiber battery of the present invention.

A schematic structure of the nickel positive electrode for a fiber battery produced as described above is shown in FIG. 5. In FIG. 5, "7" indicates carbon fiber, "8" indicates metal nickel, and "9" indicates nickel hydroxide. In this electrode, thinning of the thickness of the entire electrode including the active material layer to as small as 7 μm is enabled. By thus thinning, superior high output characteristics can be attained. On the other hand, when attaining a higher capacity is intended, the thickness of the active material layer may be increased.

Figure 6:
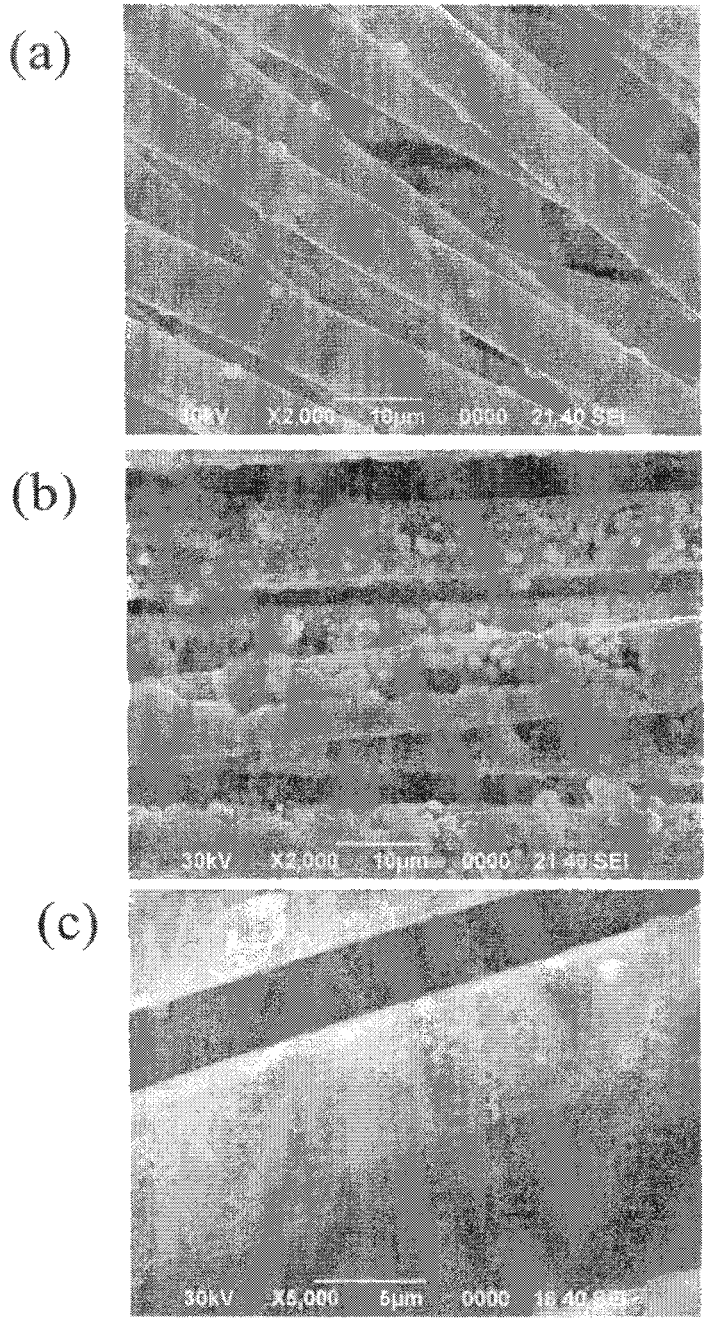
FIG. 6 shows SEM photographs of nickel hydroxide electrolytically deposited at an electric current density of 5 mA/cm2.

An SEM photograph of nickel hydroxide which was electrolytically deposited on the fibrous electricity collector with an electric current density of 5 mA/cm2 upon electrolytic deposition using a nickel nitrate bath in the above Example 1 is shown in FIG. 6 (a) to (c). In FIG. 6 (a) and FIG. 6 (b) showing the results when the electrolytic deposition time was 15 min and 30 min, respectively, insufficient coating with nickel hydroxide was suggested, whereas in FIG. 6 (c) showing the results when the electrolytic deposition time was 60 min enabling uniform coating of the fibrous electricity collector with nickel hydroxide so as to cover the entirety of the fibrous electricity collector is suggested. In addition, when FIGS. 6 (a) and (b) were compared with FIG. 6 (c), a process in which nickel hydroxide crystals join to grow cylindrically is suggested as described above.

It was revealed that when a plurality of fibers were used in a bundle, upon swelling of the active material that occurs along with charging and discharging, surrounding fibers are also swollen to lead to pressing of the active material layers one another, and thus an effect of preventing detachment and dropping of the active material layer is achieved. It was found that this phenomenon leads to a significant advantage of improving the charge and discharge cycle life of the battery. It should be noted that this phenomenon occurs as long as at least a plurality of monofilaments were used. Therefore, it is concluded that even if the number of monofilaments is as small as 2 to 10, dropping of the active material layer can be prevented by intimate assembly of the fibers with one another.

Figure 7:
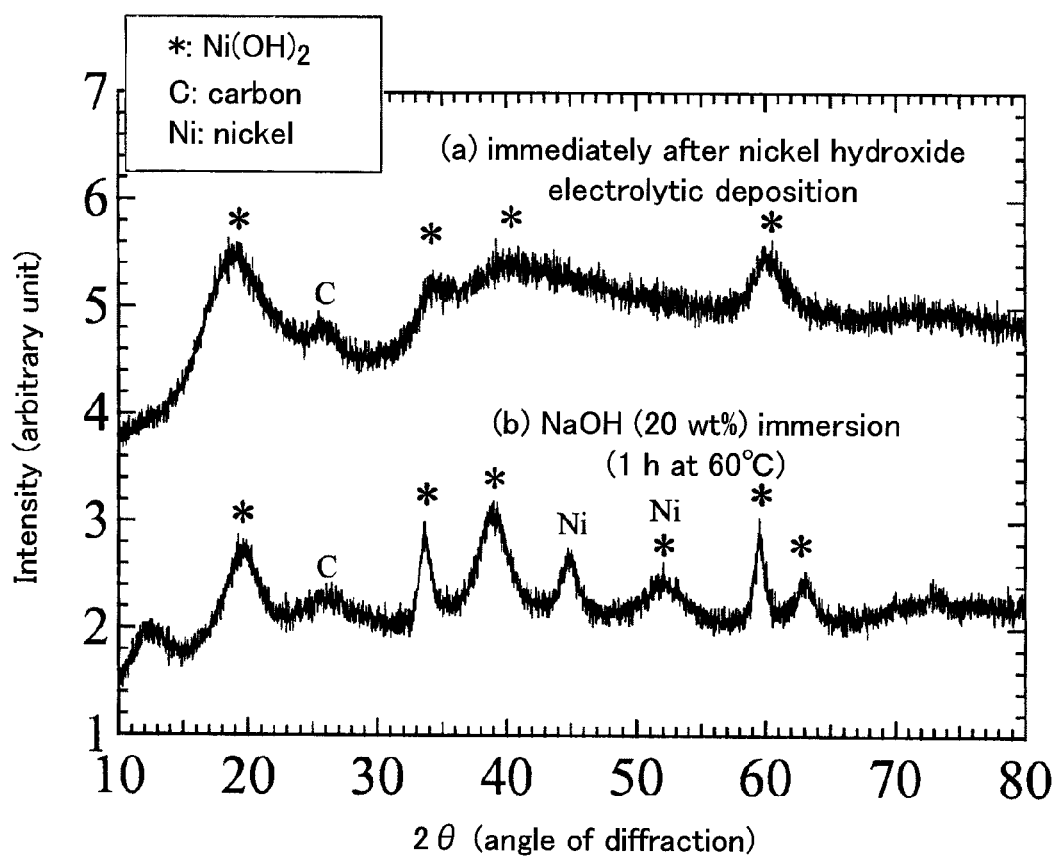
FIG. 7 shows a view illustrating an X-ray diffraction pattern indicating that the electrolytically deposited nickel hydroxide has improved crystallinity by an immersion treatment in a sodium hydroxide aqueous solution at 60° C.
Figure 8:
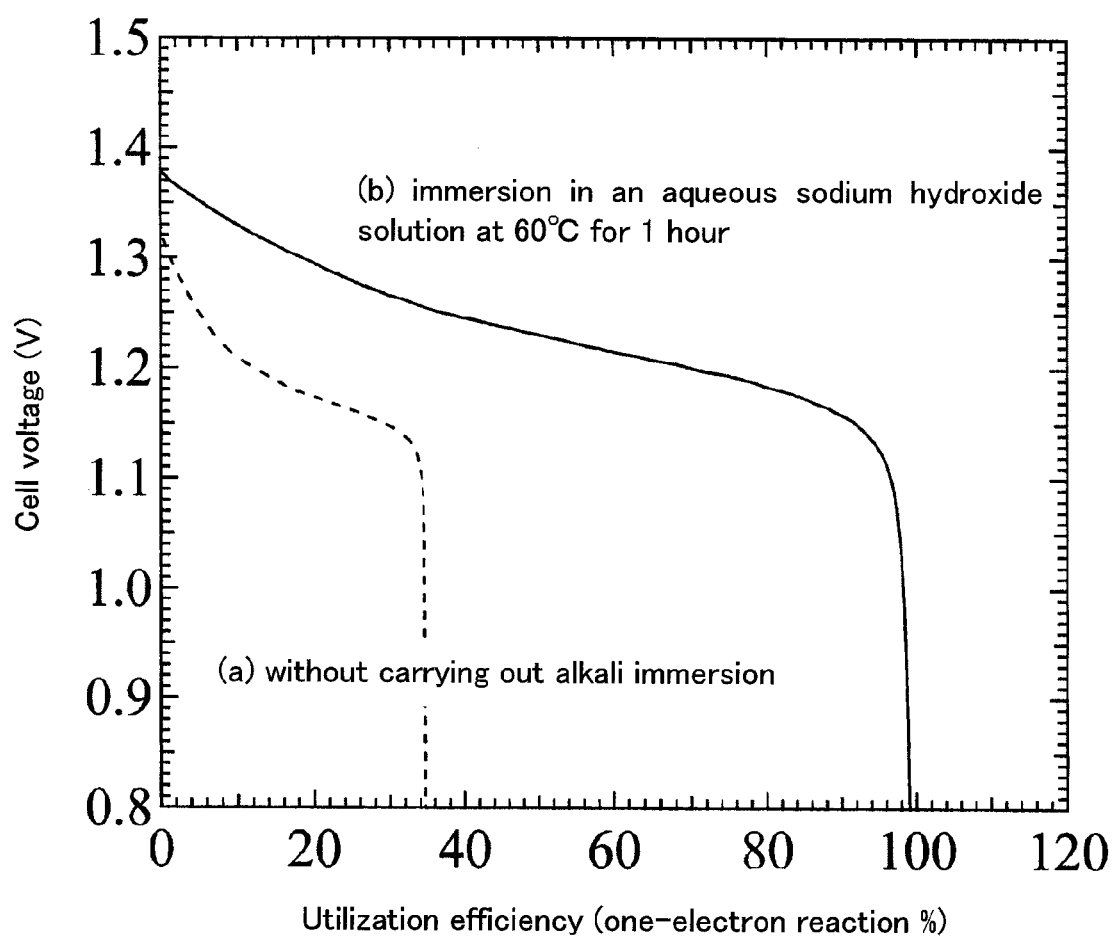
FIG. 8 shows a view indicating that a dischargeability of electrolytically deposited nickel hydroxide is significantly improved by an immersion treatment in an aqueous sodium hydroxide solution at 60° C.

In nickel hydroxide generated by an electrolytic deposition method (nickel hydroxide deposited on the fibrous electricity collector prior to immersion in the aqueous sodium hydroxide solution at 60° C. in the above Example 1), nickel nitric acid salts or amine complexes may remain partially therein, and particular diffraction peaks being broad were exhibited as shown in FIG. 7 (a). Even if charge and discharge were carried out in this state, the utilization efficiency was only about 30% as shown in FIG. 8 (a). As a result of investigations of various treatment methods such as the heat treatment and pH adjustment of the electrolytic deposition bath in attempts to satisfactorily allow to serve as an electrolytic deposit positive electrode active material, it was verified that an immersion treatment into an aqueous caustic alkali solution at high temperatures was most effective. Thus, in the electrode A obtained as described above, the electrolytic deposit transferred to crystalline nickel hydroxide as shown in FIG. 7 (b), and succeeded in achieving a utilization efficiency of 100% in a one-electron reaction as shown in FIG. 8 (b).

With respect to the crystallinity of nickel hydroxide, half band width of the X-ray diffraction peak is preferably not greater than 5° in terms of the angle of diffraction. When the half band width is beyond 5°, a state in which impurities such as nitric radicals which disturb the atomic arrangement of the crystals are included in a large amount is suggested. In this state, the function of nickel hydroxide as the active material is inhibited, and also the utilization efficiency is significantly reduced. When the angle of diffraction is not greater than 5°, it is believed that impurities which disturb the atomic arrangement and inhibit the function as the active material were almost completely removed, and the utilization efficiency in the one-electron reaction of the positive electrode can approximate a value of 100%.

Applicable caustic alkali as used herein may be sodium hydroxide, potassium hydroxide, lithium hydroxide or the like, and a mixed aqueous solution of these may be also used. However, since crystalline nickel hydroxide can be obtained within a short period of time, sodium hydroxide is particularly preferred. The concentration of the caustic alkali in the aqueous solution is not particularly limited, which may vary from a slight amount to a saturating amount, but a concentration of 10 to 30% by weight is preferred. Also the immersion temperature and the immersion time are not limit, but preferably the immersion temperature is 40 to 110° C. and the immersion time is 10 min to 24 hrs, and more preferably the immersion temperature is 60 to 80° C. and the immersion time is 1 to 5 hrs.

Although nitric radicals have been known as a cause of self-discharge, the immersion treatment in the aqueous caustic alkali solution is very effective in suppressing the self-discharge since nitric radicals can be eliminated. The immersion treatment is particularly important in applications such as intermittent discharge, in which self-discharge matters.

Thus, according to the present invention, a nickel coat layer is first formed on carbon fibers, and then uniform electrolytic deposition of nickel hydroxide is permitted on the surface of each fiber in a nickel nitrate bath. Thereafter, immersion in an aqueous caustic alkali solution results in formation of a highly crystalline nickel hydroxide layer, whereby production of a nickel positive electrode for a fiber battery that exhibits long life duration and superior high output characteristics is enabled.

Figure 9:
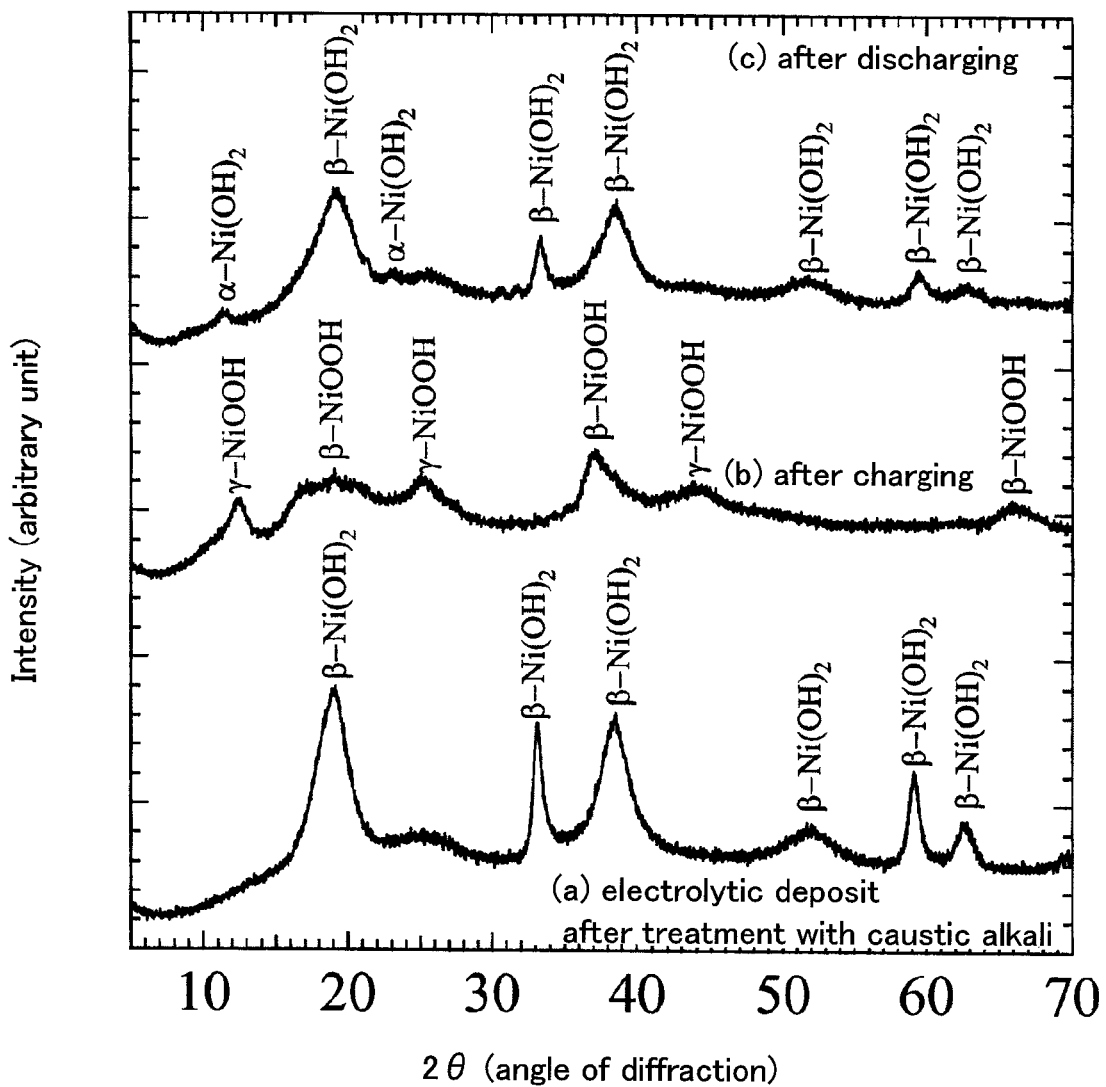
FIG. 9 shows X-ray diffraction patterns of electrolytic deposit in an aqueous nickel nitrate solution.
Figure 10:
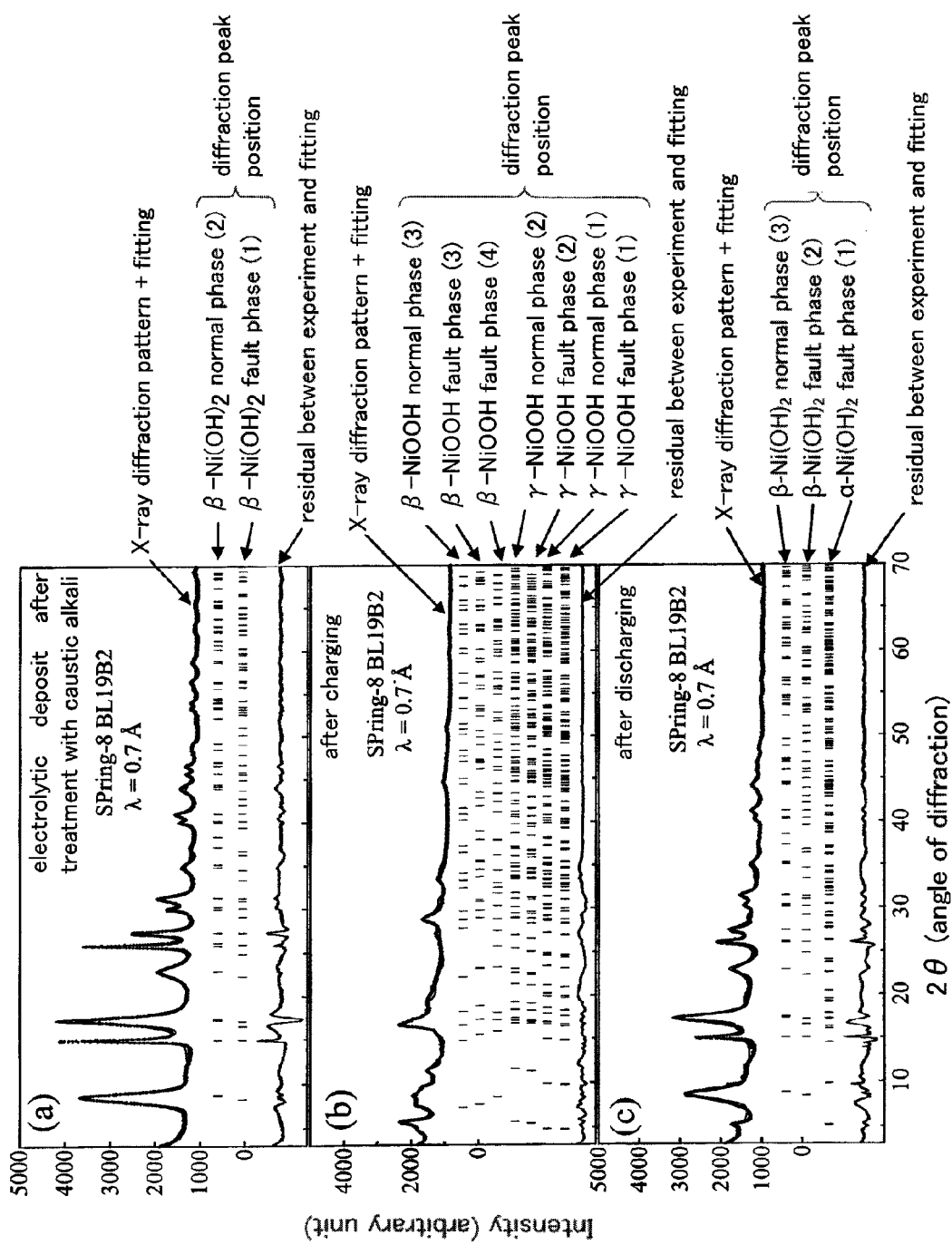
FIG. 10 shows X-ray diffraction patterns and results of structural analyses of electrolytic deposit in an aqueous nickel nitrate solution.

With respect to the electrode A obtained in Example 1, X-ray diffraction patterns determined under conditions involving CuKα-ray, λ=1.54056 Å are shown in FIG. 9, and X-ray diffraction patterns determined under conditions involving SPring-8, BL19B2 and λ=0.7 Å are shown in FIG. 10. FIG. 9 and FIG. 10 show X-ray diffraction patterns of fibrous nickel hydroxide obtained by electrolytic deposition, indicating that a β-structure (β-Ni(OH)2) was formed. The volume of β-NiOOH formed by charging contracted as compared with the volume of β-Ni(OH)2.

Figure 11:
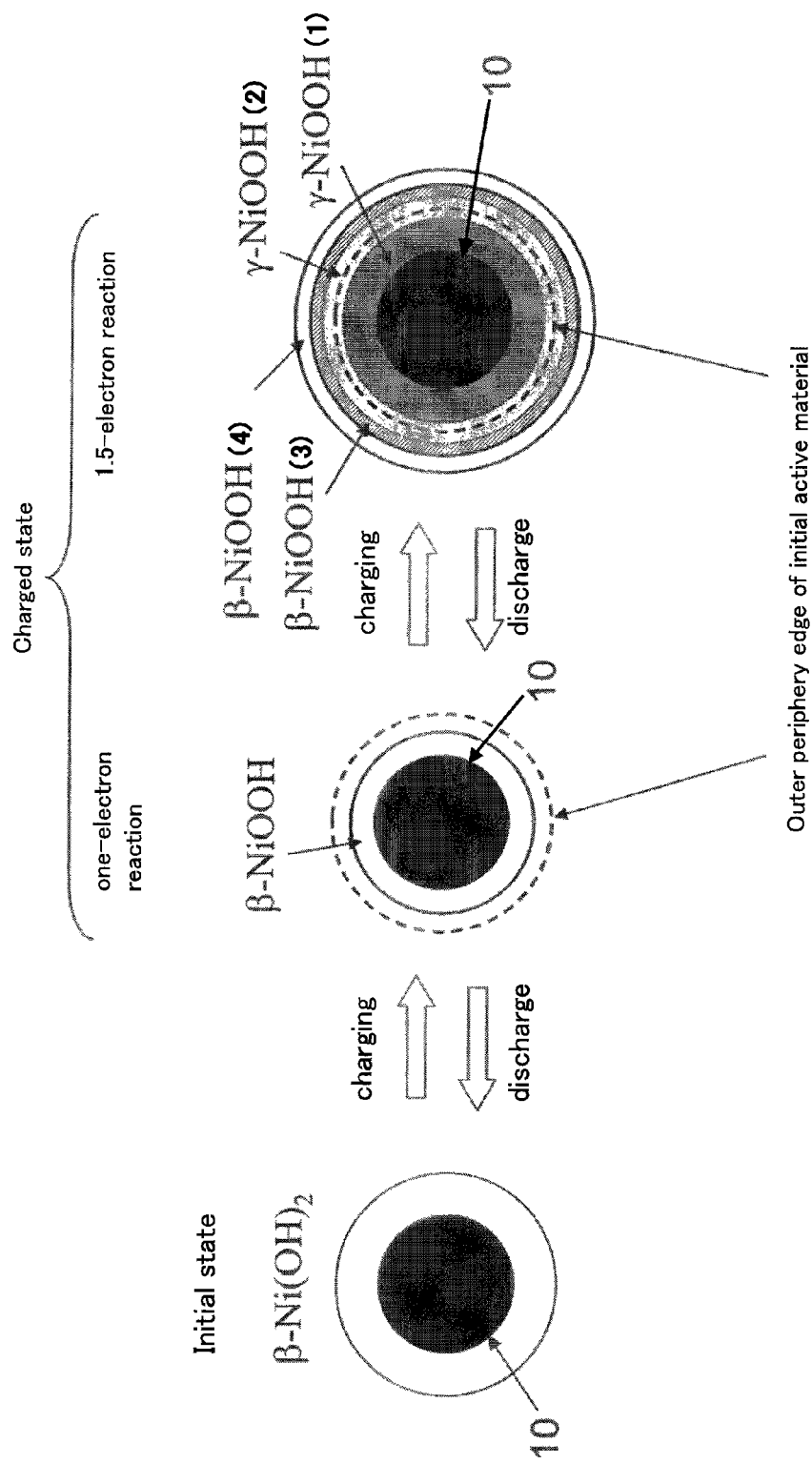
FIG. 11 shows a schematic view illustrating a cross section indicating the state of change, accompanying with charge and discharge, in volume of β-Ni(OH)2 cylindrically applied on a carbon fiber.

This causes, as shown in FIG. 11, contraction of the active material layer along with charging, accompanying with change from β-Ni(OH)2 to β-NiOOH and thus adhered to carbon fiber 10 (indicated by black circle), whereby dropping can be avoided. On the other hand, when charged to exceed a one-electron reaction, as shown in FIG. 11, γ-NiOOH is formed on an immediately external side of the carbon fiber 10. This reaction is accompanied by expansion of the volume by 30 to 40%, to the contrary. However, the nickel positive electrode of the present invention has long life duration, and 2,000 times or more charge and discharge cycle life is enabled. The reasons include cylindrical β-NiOOH layer formed on the outer periphery of the active material layer exhibits an effect of preventing dropping of the γ-NiOOH layer present inside.

When a crystal structure analysis of the X-ray diffraction pattern was carried out by a Rietveld method, it was proven that the electrode A of Example 1 produced by subjecting to an alkali immersion treatment after the electrolytic deposition included 65% by weight of β-Ni(OH)2 being a normal phase (ideal phase), but 35% by weight of β-Ni(OH)2 being a fault phase is included as shown in Table 1 below. As referred to herein, the normal phase means general nickel hydroxide which is commonly known, and the fault phase means nickel hydroxide having a structure in which a nickel atom site shifted from the normal phase of (0, 0, 0) to (⅔, ⅓, 0). According to Prior Art Literature (Journal of the Electrochemical Society 155 A936-A944 (2008)), in spherical nickel hydroxide powders generated by allowing a general aqueous nickel salt solution to react with an aqueous caustic alkali solution, the proportion of the β-Ni(OH)2 phase being a fault phase is about 20%. In an attempt to form a nickel hydroxide layer cylindrically so as to have a large curvature in the fibrous electrode of the present invention, it is believed that many fault phases were incorporated.

In an active material layer formed from a normal phase and a fault phase, the proportion of the fault phase is preferably 25 to 50%. When the proportion of the fault phase is less than 25%, distortion of the active material layer is likely to occur as compared with the case in which the proportion is not less than 25%. Thus, along with expansion and contraction upon charge and discharge, the active material layer is likely to be detached and dropped, and thus cycle life is deteriorated. Due to the normal phase being present at a high proportion, conversion from β-NiOOH to γ-NiOOH is likely to occur when further charged to exceed the one-electron reaction as described later, but the rate of reversion from γ-NiOOH to β-Ni(OH)2 upon discharge also increases, and the rate of stable presence as α-Ni(OH)2 in the discharge state decreases. Thus, as compared with the case in which the proportion of the fault phase is not less than 25%, discharge voltage and utilization efficiency are reduced, leading to disadvantages in attaining a higher output and a higher capacity. On the other hand, when the proportion of the fault phase is greater than 50%, the rate of conversion from β-NiOOH to γ-NiOOH decreases upon further charging to exceed the one-electron reaction, whereby the charging efficiency is lowered. The charge exceeding 100% becomes likely to be consumed upon generation of oxygen from the positive electrode, and thus the active material becomes likely to be detached and dropped when bubbles of oxygen are generated. Therefore, also the proportion of the fault phase exceeding 50% is disadvantageous for cycle life, and attaining a higher output, and a higher capacity.

TABLE 1

| | Phase | (% by weight) | Lattice constant (A) | Lattice volume (A3) |
|---|---|---|---|---|
| (1) | β-Ni(OH2) (fault phase) | 35.0 | 35.0 a = 3.128 (2) c = 4.898 (3) | 41.5 |
| (2) | β-Ni(OH2) (Normal phase) | 65.0 | 65.0 a = 3.140 (2) c = 4.654 (2) | 39.7 |

As shown in Table 2 below, β-NiOOH and γ-NiOOH were found from the crystal structure analysis in the state being charged to exceed the one-electron reaction (1.5-electron reaction) of the electrode A obtained in Example 1. It is to be noted that in the following Table 2 and Table 3, values presented in the parentheses of the column of Lattice volume indicate ⅓ of lattice volume. Atomic arrangements of γ-NiOOH and α-Ni(OH)2 were different from those of β-NiOOH and β-Ni(OH)2, and the basic unit lattice in the former corresponds to three basic unit lattices in the latter. In other words, when the former and the latter are compared according to the same criteria, the lattice volume of γ-NiOOH and α-Ni(OH)2 must be divided by 3.

TABLE 2

| | Phase | (% by weight) | Lattice constant (A) | Lattice volume (A3) |
|---|---|---|---|---|
| (1) | γ-NiOOH (normal phase 1) | 33.3 | a = 2.809 (2) c = 24.29 | 166.1 (55.4) |
| | γ-NiOOH (fault phase 1) | 6.2 | a = 2.854 (3) c = 24.52 (2) | 172.9 (57.6) |
| (2) | γ-NiOOH (normal phase 2) | 26.2 | a = 2.798 (4) c = 20.91 (2) | 141.9 (47.3) |
| | γ-NiOOH (fault phase 2) | 4.4 | a = 2.802 (2) c = 21.41 (1) | 145.6 (48.5) |
| (3) | β-NiOOH (normal phase 1) | 7.5 | a = 2.9 (3) c = 4.704 (5) | 34.7 |
| | β-NiOOH (fault phase 1) | 16.1 | a = 2.709 (2) c = 5.209 (5) | 33.1 |
| (4) | β-NiOOH (fault phase 2) | 6.3 | a = 2.801 (1) c = 5.44 (3) | 37.1 |

In the vicinity of the carbon fiber, charging is more likely to proceed as compared with the outer periphery of the active material layer, and the reaction proceeds via formation of β-NiOOH by the one-electron reaction to correspond to 1.5 electrons, thereby forming γ-NiOOH; however, the reaction proceeds to only to one-electron reaction on the outer periphery of the active material layer, and β-NiOOH remains unchanged even if further charged. As shown in FIG. 10 (b) and Table 2, it was also proven that a plurality of phases were present depending on the charged state, even with the same γ-NiOOH and β-NiOOH. As shown in FIG. 11, there exist phases with different charging states in the order of γ-NiOOH (1), γ-NiOOH (2), β-NiOOH (3) and β-NiOOH (4) from the highly charged region in the vicinity of the carbon fiber 10 to less charged region on the outer periphery.

From Table 2, it is proven that the lattice constant of the β-phase in the laminating direction increased by about 10% compared with usual powdery materials. It is believed that the increase occurred since the β-NiOOH layer present on the outer periphery also extended to meet the expansion of the volume of γ-NiOOH being present inside. Accordingly, it was revealed that the β-NiOOH layer flexibly expanded and contracted to meet the change in volume inside, and thus has a function of preventing dropping of the active material. The state in which a γ-NiOOH phase in the vicinity of the carbon fiber 10 and a β-NiOOH layer phase on the outer periphery are present can be established when charged in an amount to exceed a theoretical capacity (289 mAh/g=100%) of the one-electron reaction charging. As described later, when charged in an amount of 110%, discharge of 108% is enabled, which is most suitable in applications requiring long life duration and high capacity such as, for example, electric power supplies for mobile. On the other hand, when charged in an amount of not greater than 100%, β-NiOOH is formed on the entirety of the active material layer. In applications such as standby electric power supply to prepare for power outage in which a high capacity is not particularly needed, the amount of charging employed may be not greater than 100%. It is to be noted that since such a case is not accompanied by expansion of the volume of the active material layer due to conversion from β-NiOOH to γ-NiOOH, particularly long life duration is achieved. Therefore, it is most suitable in applications having long life duration but not requiring that high capacity. Furthermore, as shown in the following Table 3, according to the structural analysis of the electrode A obtained in Example 1 in the discharge state, β-Ni(OH)2 and α-Ni(OH)2 were observed.

TABLE 3

| Phase | (% by weight) | Lattice constant (A) | Lattice volume (A3) |
|---|---|---|---|
| (1) α-Ni(OH2) (fault phase 1) | 9.3 | a = 2.945 (4) c = 25.39 (6) | 190.9 (63.3) |
| (2) β-Ni(OH2) (fault phase 1) | 26.7 | a = 3.137 (3) c = 4.926 (3) | 42.0 |
| (3) β-Ni(OH2) (Normal phase 1) | 64.0 | a = 3.141 (2) c = 4.670 (2) | 40.3 |

As shown in Table 3, the proportion of α-Ni(OH)2 in the discharged state is about 10% by weight. Atomic arrangement of α-Ni(OH)2 is similar to that of γ-NiOOH, and only one difference therebetween is the value of the lattice constant. In other words, discharge is completed while maintaining the atomic arrangement of a part of γ-NiOOH formed by charging, and transferred to α-Ni(OH)2 after discharging without reverting to β-Ni(OH)2.

From Table 2, % by weight of the normal phase occupying γ-NiOOH is greater than % by weight of the fault phase, indicating that conversion from β-NiOOH to γ-NiOOH tends to be caused by the 1.5-electron reaction in the normal phase.

On the other hand, it was proven that α-Ni(OH)2 following discharging consists only of the fault phase as shown in Table 3. The % by weight of γ-NiOOH of the observed fault phase shown in Table 2 is almost equal to the % by weight of α-Ni(OH)2 shown in Table 3. Accordingly, it was revealed that the fault phase tended to be less likely to change from β-NiOOH to γ-NiOOH as compared with the normal phase; however, once changed to γ-NiOOH, reversion via β-NiOOH to β-Ni(OH)2 hardly occurred, and thus the structure of α-Ni(OH)2 was maintained.

Owing to thus stably existing α-Ni(OH)2 in part, γ-NiOOH is likely to be formed when recharging is carried out. Thus, discharging of a high voltage exceeding 1.3 V and beyond 100% is enabled.

Comparison of Table 2 with Table 3 indicates that the proportion of the fault phase included in the β phase was unchanged even after charge and discharge were repeated, suggesting that a cylinder type active material layer was maintained. With respect to the α phase, the lattice volume thereof is 5 to 10% smaller as compared with common powder sample, revealing that an α-Ni(OH)2 layer having a higher density was formed in comparison with conventional ones.

Accordingly, nickel hydroxide electrolytically deposited cylindrically became a distinct material that is different from conventional powdery nickel hydroxide in terms of the proportion of the fault phase, and the volume of the crystal lattice. It was also proven that owing to a unique charge and discharge mechanism reflecting a cylindrical shape such as formation of a two-layer structure from a β-phase and a γ-phase, and the like, maintaining a long cycle life is enabled.

Example 2

In order to examine an effect of addition of aluminum hydroxide to nickel hydroxide, a solution for electrolytic deposition was prepared by adding 5,000 g of water to 1,600 g of nickel nitrate (hexahydrate) and 420 g of aluminum nitrate (nonahydrate), and adjusting the pH to 5. Electrolytic deposition was carried out in this solution with as a cathode the fibrous electricity collector obtained similarly to Example 1 and subjected to nickel plating, the nickel plate as an anode, and a nonwoven polypropylene fabric as a separator provided between both electrodes. Electrodeposition conditions involved an electric current density of 20 mA/cm2, and an electrolytic deposition time of 10 min. In this case, nickel hydroxide and aluminum hydroxide were electrodeposited, and the electrolytic deposition efficiency thereof was about 42%. The content of aluminum hydroxide was 22% by mole of metal equivalent (i.e., in terms of aluminum with respect to nickel). The mixed layer of nickel hydroxide and aluminum hydroxide electrolytically deposited on the fibrous electricity collector had a thickness of 21 μm on average, and the aforementioned mixed layer was deposited to give a thickness of about 11 μm also among monofilaments configuring the fibrous electricity collector.

The fibrous electricity collector on which the mixed layer deposited was immersed in a 20% by weight aqueous sodium hydroxide solution at 60° C. for 1 hour. Next, washing with water and drying gave the nickel positive electrode for a fiber battery of the present invention. The packing density of the active material was about 600 mAh/cc including the electricity collector. Thus obtained positive electrode is referred to as electrode B.

Figure 12:
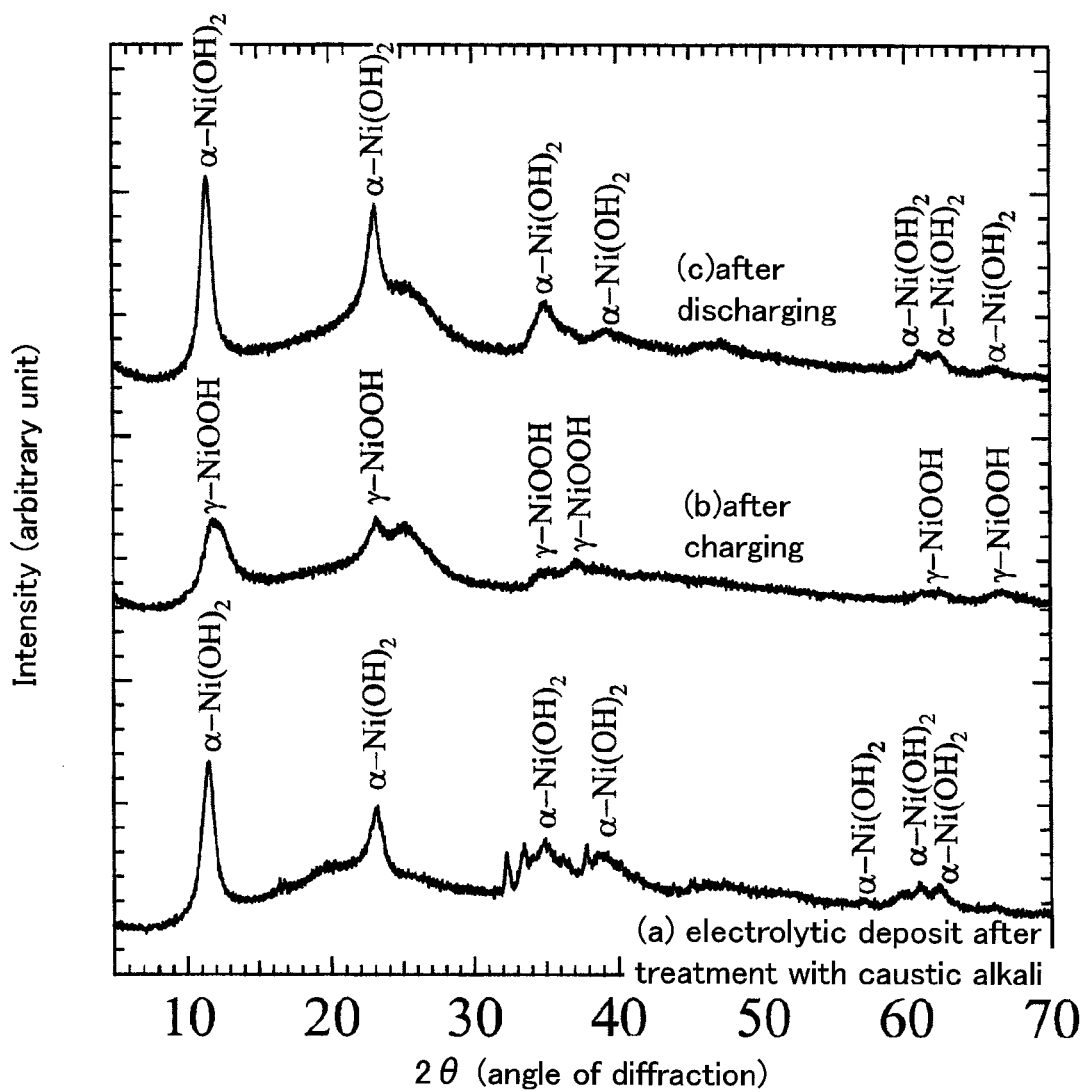
FIG. 12 shows X-ray diffraction patterns on an electrolytic deposit in an aqueous nickel nitrate solution to which aluminum nitrate was added.

With respect to the electrode B obtained in Example 2, X-ray diffraction patterns determined under conditions involving CuKα-ray, λ=1.54056 Å are shown in FIG. 12.

Figure 13:
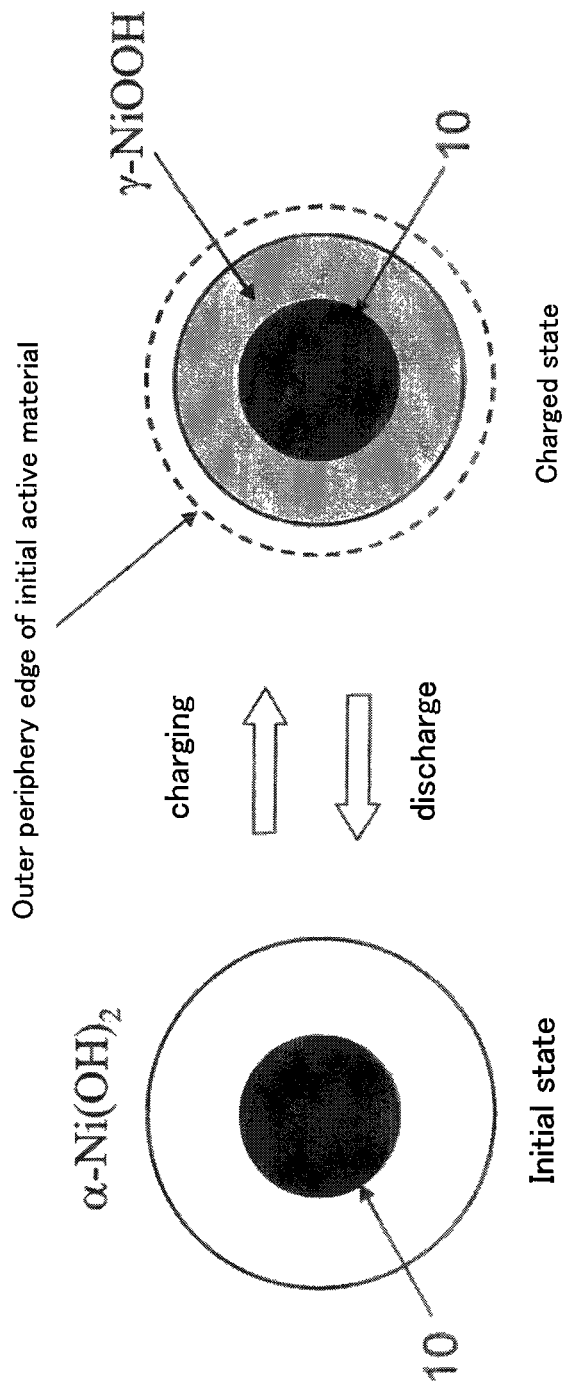
FIG. 13 shows a schematic view a cross section indicating the state of change, accompanying with charge and discharge, in volume of α-Ni(OH)2 cylindrically applied on a carbon fiber in an electrode D obtained in Example 4 of the present invention.
Figure 1:
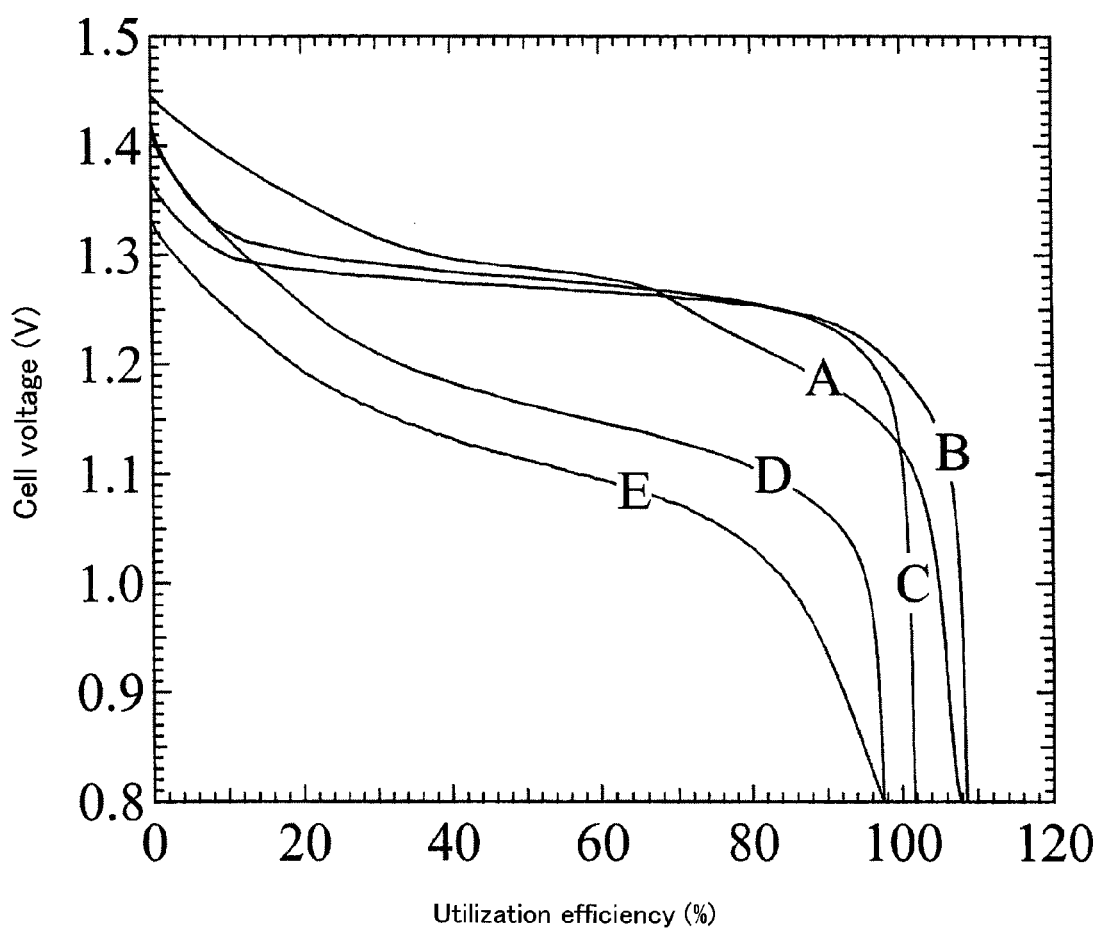
Figure 1:
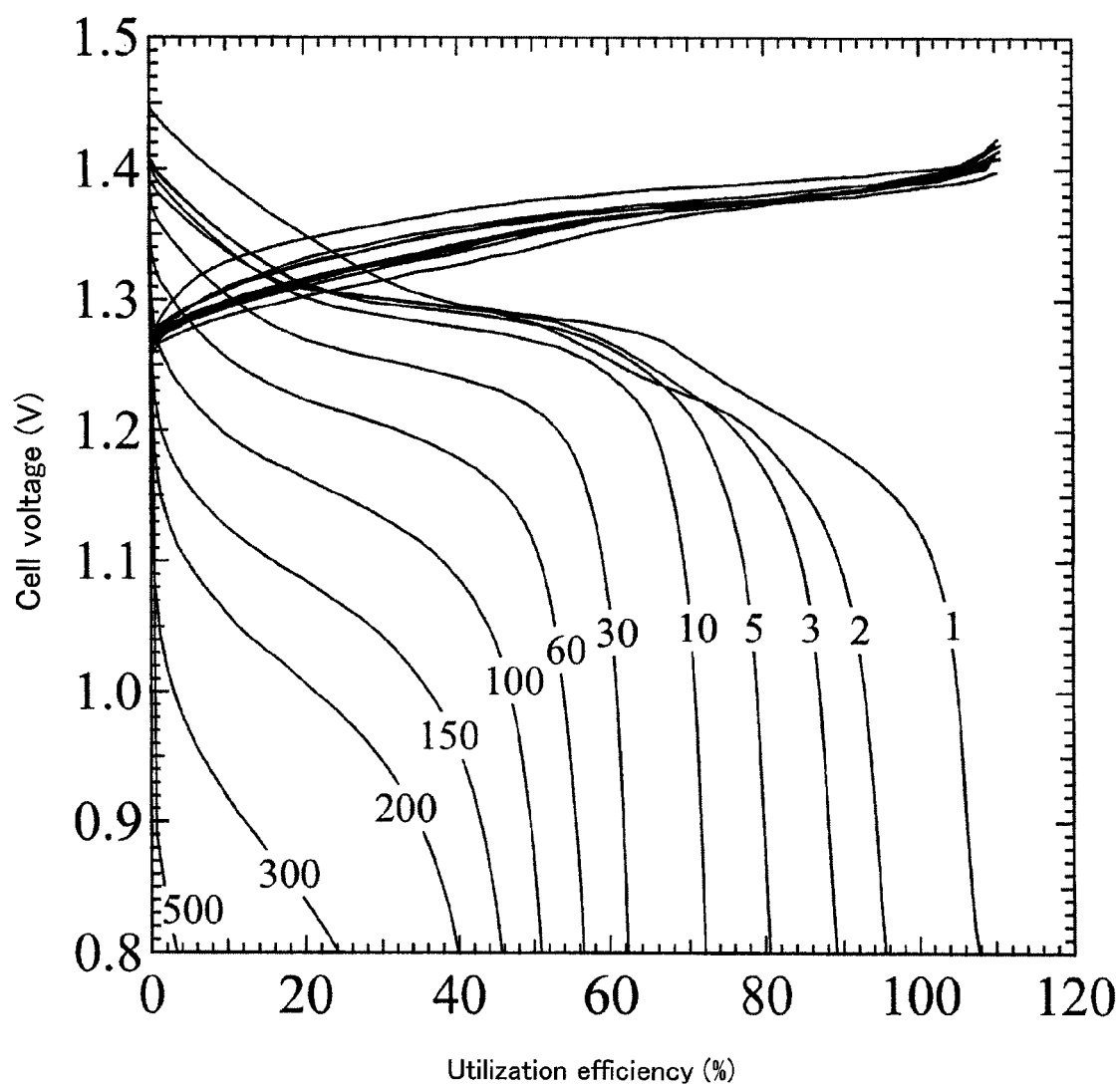

As shown in FIG. 12, nickel hydroxide having an α-type structure was formed. It was changed to γ-NiOOH alone by charging, and returned to α-Ni(OH)2 alone after discharging. When thus charging yields only γ-NiOOH from α-Ni(OH)2, contraction of the active material phase in volume, as shown in FIG. 13, resulted in 30% contraction toward the central portion of the carbon fiber 10. Thus, it was clarified that adhesiveness between the active material and the electricity collector was improved. In this case, even if expansion of the volume occurred in the step of discharging, the volume merely returns to the initial state; therefore, detachment and dropping of the active material layer from the electricity collector are believed to be suppressed. Therefore, 2,000 times or more cycle life is enabled also in such a case.

γ-NiOOH predominantly generated by charging to exceed the one-electron reaction enables a 1.5 to 2-electron reaction, and the capacity density of 289 mAh/g as calculated on the basis of changing from nickel hydroxide to γ-NiOOH is elevated to 120 to 150%.

Example 3

In order to examine an effect of addition of a conductant agent and a binder to nickel hydroxide, a solution for electrolytic deposition was prepared by adding 5,000 g of water to 2,000 g of nickel nitrate (hexahydrate), 85 g of a particulate carbon material and 21 g of PVA, and adjusting the pH to 5. Electrolytic deposition was carried out in this solution with as a cathode the fibrous electricity collector obtained similarly to Example 1 and subjected to nickel plating, the nickel plate as an anode, and a nonwoven polypropylene fabric as a separator provided between both electrodes. Electrodeposition conditions involved an electric current density of 20 mA/cm2, and an electrolytic deposition time of 10 min. In this case, nickel hydroxide was electrodeposited concomitant with deposition of particulate carbon material and PVA, and the electrolytic deposition efficiency thereof was about 39%. The content of the particulate carbon material was 20% by weight. The mixed layer of nickel hydroxide, the particulate carbon material and PVA electrolytically deposited on the fibrous electricity collector had a thickness of 13 μm on average, and the aforementioned mixed layer was deposited to give a thickness of about 15 μm also among monofilaments configuring the fibrous electricity collector.

The fibrous electricity collector on which the mixed layer deposited was immersed in a 20% by weight aqueous sodium hydroxide solution at 60° C. for 1 hour. Next, washing with water and drying gave the nickel positive electrode for a fiber battery of the present invention. The packing density of the active material was about 500 mAh/cc including the electricity collector. Thus obtained positive electrode is referred to as electrode C.

Example 4

In order to examine an effect of addition of cobalt hydroxide to nickel hydroxide, a solution for electrolytic deposition was prepared by adding 5,000 g of water to 2,000 g of nickel nitrate (hexahydrate) and 120 g of cobalt nitrate (hexahydrate), and adjusting the pH to 5. Electrolytic deposition was carried out in this solution with as a cathode the fibrous electricity collector obtained similarly to Example 1 and subjected to nickel plating, the nickel plate as an anode, and a nonwoven polypropylene fabric as a separator provided between both electrodes. Electrodeposition conditions involved an electric current density of 20 mA/cm2, and an electrolytic deposition time of 10 min. In this case, cobalt hydroxide and aluminum hydroxide were electrodeposited, and the electrolytic deposition efficiency thereof was about 42%. The content of cobalt hydroxide was 5.3% by mole of metal equivalent (i.e., in terms of cobalt with respect to nickel). The mixed layer of nickel hydroxide and cobalt hydroxide electrolytically deposited on the fibrous electricity collector had a thickness of 13 μm on average, and the aforementioned mixed layer was deposited to give a thickness of about 15 μm also among monofilaments configuring the fibrous electricity collector.

The fibrous electricity collector on which the mixed layer deposited was immersed in a 20% by weight aqueous sodium hydroxide solution at 60° C. for 1 hour. Next, washing with water and drying gave the nickel positive electrode for a fiber battery of the present invention. The packing density of the active material was about 600 mAh/cc including the electricity collector. Thus obtained positive electrode is referred to as electrode D.

Reference Example

As Reference Example, an effect of coating cobalt hydroxide on the surface of nickel hydroxide was examined. More specifically, a solution for electrolytic deposition was prepared by adding 5,000 g of water to 2,100 g of nickel nitrate (hexahydrate), and adjusting the pH to 5. Electrolytic deposition was carried out in this solution with as a cathode the fibrous electricity collector obtained similarly to Example 1 and subjected to nickel plating, the nickel plate as an anode, and a nonwoven polypropylene fabric as a separator provided between both electrodes. Electrodeposition conditions involved an electric current density of 20 mA/cm2, and an electrolytic deposition time of 8 min. In this case, the electrolytic deposition efficiency of nickel hydroxide was about 45%. The nickel hydroxide electrolytically deposited on the fibrous electricity collector had a thickness of 12 μm on average, and the nickel hydroxide was deposited to give a thickness of about 15 μm also among monofilaments configuring the fibrous electricity collector.

A nickel positive electrode for a fiber battery similar to Example 1 was produced. Next, a treatment of forming a cobalt compound on the surface was carried out. More specifically, after the nickel positive electrode for a fiber battery was immersed in an aqueous solution prepared by dissolving 500 g of cobalt nitrate (heptahydrate) in 3000 g of water, and dried at 80° C. for 20 min. Next, after immersing in a 20% by weight aqueous sodium hydroxide solution, an oxidation treatment was carried out in a temperature-controlled room at 105° C. for 1 hour to obtain the nickel positive electrode for a fiber battery of the present invention. The packing density of the active material was about 590 mAh/cc including the electricity collector. Thus obtained positive electrode is referred to as electrode E.

Comparative Examples 1 to 3

For comparison, commercially available foamed nickel having a degree of porosity of 95% was employed as an electricity collector and the thickness thereof was adjusted to 600 μm. Thereafter the electricity collector of foamed nickel was filled with a slurry of nickel hydroxide prepared using carboxymethyl cellulose as a thickening agent so as to give a packing density of 620 mAh/cc which is the same as that of the electrode A of Example 1, and compressed with a roller pressing machine to 400 μm, whereby an electrode A' (nickel electrode) was obtained (Comparative Example 1).

Foamed nickel as an electricity collector having a thickness adjusted similarly to Comparative Example 1 was employed. The electricity collector of foamed nickel was filled with a slurry of nickel hydroxide to which cobalt hydroxide was added so as to give a composition which is the same as that of the electrode D of Example 4 so as to give a packing density of 600 mAh/cc which is the same as that of the electrode D of Example 4, and compressed with a roller pressing machine to 400 μm, whereby an electrode B' (nickel electrode) was obtained (Comparative Example 2).

Foamed nickel as an electricity collector having a thickness adjusted similarly to Comparative Example 1 was employed. The electricity collector of foamed nickel was filled with a slurry of nickel hydroxide prepared using carboxymethyl cellulose as a thickening agent so as to give a packing density of 590 mAh/cc which is the same as that of the electrode E of Reference Example, followed by coating cobalt hydroxide under the same condition as that of the electrode E of Reference Example, and compressed with a roller pressing machine to 400 μm, whereby an electrode C' (nickel electrode) was obtained (Comparative Example 3).

Evaluation of Characteristics

Each nickel electrode (electrodes A to E, and electrodes A' to C') obtained in Examples 1 to 4, Reference Example and Comparative Examples 1 to 3 was used as a positive electrode to configure a cell for evaluation in characteristic test using as a negative electrode of the counter electrode a hydrogen absorbing alloy negative electrode having a calculated capacity of 10 times. This hydrogen absorbing alloy negative electrode is obtained by applying a slurry prepared by adding well-known paste form hydrogen absorbing alloy (MmNi based quinary alloy containing Al, Mn, Co) powders to a 1% aqueous carboxymethyl cellulose solution on two faces of a punching metal (electricity collector) produced by nickel plating on iron.

A polypropylene nonwoven fabric which had been subjected to a hydrophilizing treatment having a thickness of 150 μm and a degree of porosity of 50% was provided as a separator between both electrodes to configure a cell for evaluation in characteristic test. As an electrolyte solution, a solution prepared by dissolving 1.5% by weight of lithium hydroxide in a 30% by weight aqueous potassium hydroxide solution was used.

Figure 16:
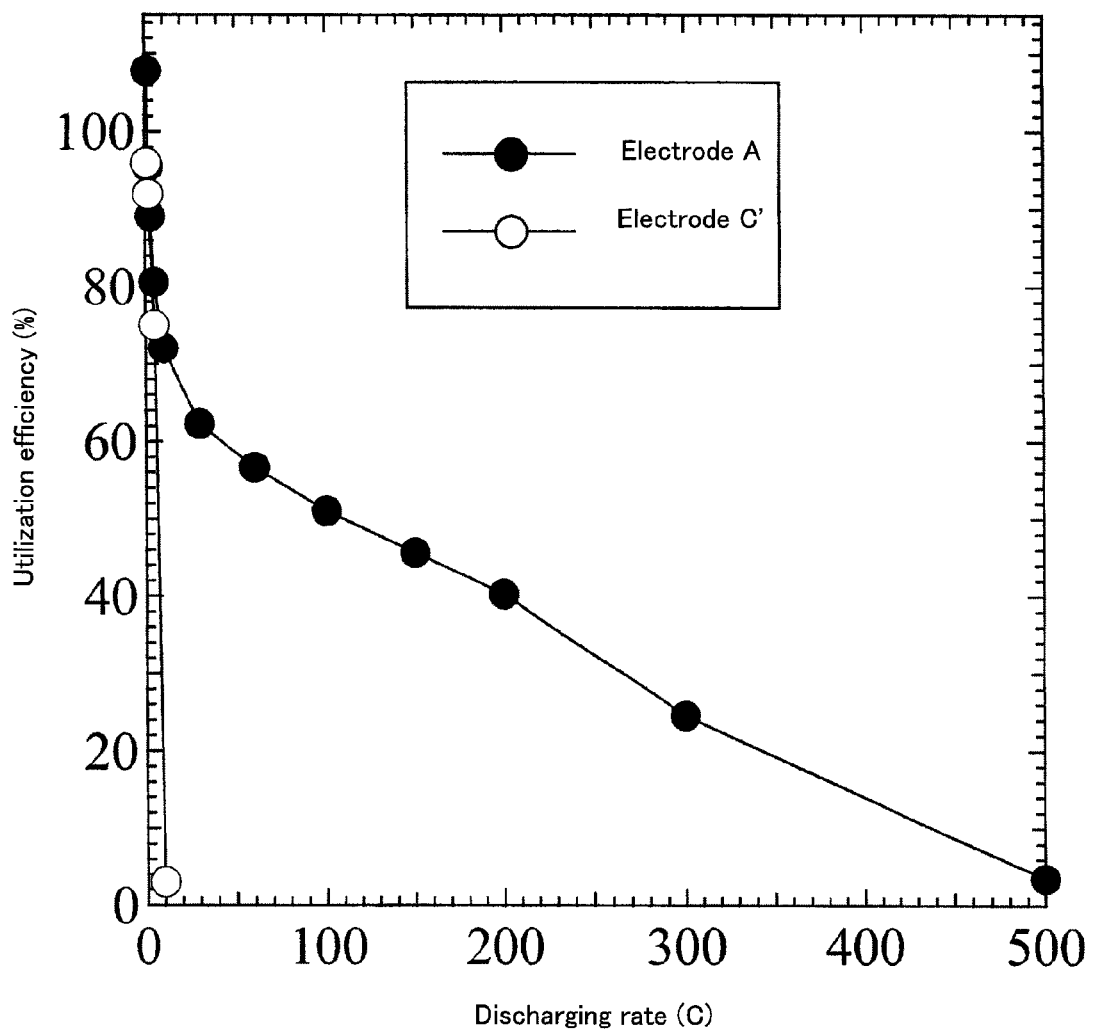
FIG. 16 shows a view illustrated by plotting of utilization efficiency discharged at 1 to 500 C-rate after 110% charging at 1 C-rate for Example 1 (electrode A) and Comparative Example 3 (electrode C').

Since the present invention aims at a higher output in addition to life duration, a high rate dischargeability of each battery at an ambient temperature of 30° C. was measured. The results are shown in FIGS. 14 to 16 and Table 4. The amount of charge was 110%, and the discharge cut-off voltage was 0.8 V. For reference, in generally used conventional batteries, charging is controlled by a ΔV system or a ΔT system, and charging is completed with 100% of a one-electron reaction. Although charging can be controlled also in the battery of the present application, it was found that a high capacity and high output can be attained by further charging to exceed 100%, for example, 110% charging as described above. Although the amount of charge employed was 110% in the present embodiment, charging to 120 to 160% enables more γ-NiOOH phase to be formed, and still further high capacity can be also attained. This feature is based on a structural advantage of the fiber electrode in which a γ-NiOOH phase is formed inside the active material layer, and a β-NiOOH phase is present on the external side.

FIG. 14 shows one example of discharge curves of Examples 1 to 4 (electrodes A to D) and Reference Example (electrode). Charge and discharge ratios were defined to be 1 C rate, respectively, and charged to 110% of the discharge capacity. In the case of the electrode A of Example 1, a discharge curve including two phases of a flat part of 1.3 V, and a part of 1.15 V was observed. The discharge curves of the electrode D of Example 4 and the electrode E of Reference Example represent a curve including one phase of about 1.18 V and about 1.15 V, respectively. The electrode B of Example 2, and the electrode C of Example 3 give discharge curves including one phase of 1.3 V with favorable flatness. High output characteristics of 1.3 V observed with Examples 1 to 3 (electrodes A to C) are proportional to the production rate of the γ-NiOOH phase produced along with charging. In the cases of the electrode D of Example 4, and the electrode E of Reference Example, β-NiOOH is predominantly produced by charging; therefore, the discharge voltage of 1.3 V was scarcely observed.

TABLE 4

|  | Electrode | 1 C Average discharge voltage (V) |
| --- | --- | --- |
| Example 1 | A | 1.3 |
| Example 2 | B | 1.3 |
| Example 3 | C | 1.29 |
| Example 4 | D | 1.18 |
| Reference Example | E | 1.15 |
| Comparative Example 1 | A' | 1 |
| Comparative Example 2 | B' | 1.1 |
| Comparative Example 3 | C' | 1.11 |

As is clear from Table 4, the average discharge voltage of the nickel positive electrodes of Examples (electrodes A to D) exhibited a higher value as compared with Comparative Examples (electrodes A' to C'), revealing that Examples had superior high output characteristics.

According to the electrode B of Example 2, addition of aluminum leads to stabilization of the α-type structure of Ni(OH)2; therefore, attaining a higher capacity by a 1.5 to 2-electron reaction is enabled, and discharge of not less than 100% is enabled. In fact, the amount of discharge after 115% charging was 110%, and the amount of discharge after 130% charging was 120%. Also in the electrode A of Example 1, since the α phase is stably present in part, it is capable of discharging to exceed 100%. In fact, an aspect of 108% discharge following 110% charging can be ascertained in FIG. 14.

Figure 18:
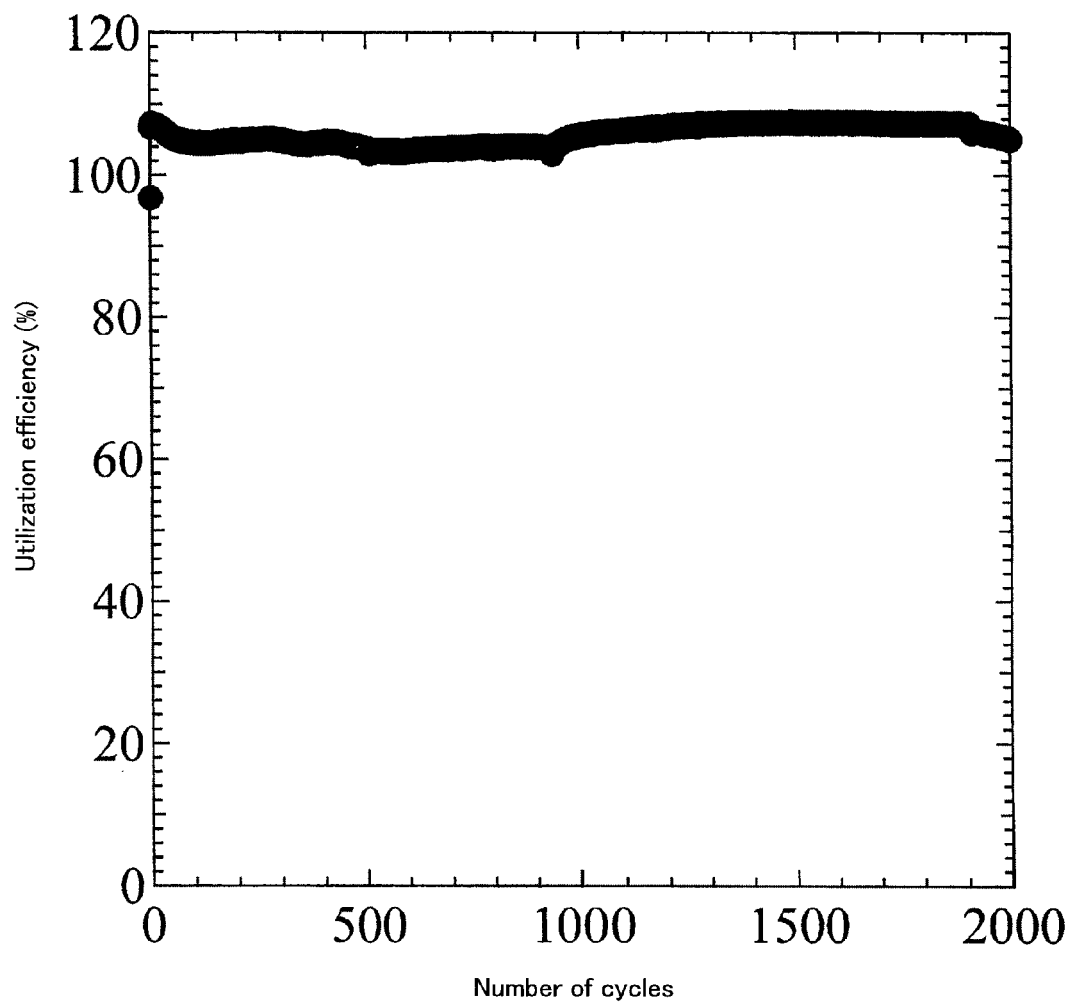
FIG. 18 shows a view illustrated by plotting of utilization efficiency up to 2,000 cycles when discharged at 1 C-rate after 110% charging at 1 C-rate for Example 1 (electrode A).

Next, life duration of the battery which was similarly configured using each nickel electrode (electrodes A to E) was determined. After well-known mild charge and discharge were repeated, charge and discharge at the 1 C rate were repeated at an ambient temperature of 45° C. The charging of 110% of the battery capacity, and the discharging with a cut-off voltage of 0.8 V were carried out. As a result, as shown in FIG. 18 with respect to the case of the electrode A by way of a typical example, all the electrodes A to E did not resulted in reduction of the utilization efficiency after 2,000 cycles.

To the contrary, the utilization efficiency was reduced by 80% after 850 cycles for the electrode A', after 950 cycles for the electrode B', and after 1,010 cycles for the electrode C'. Accordingly, it was proven that the electrode of the present invention has a long life duration. The reason for the long life duration may involve that the nickel electrode of the present invention has an active material layer formed cylindrically around the fibrous electricity collector, and thus hardly includes a cross section of the electrode distinct from generally used platy electrodes, leading to extremely superior contact properties between the electricity collector and the active material even if the active material is repeatedly expanded and contracted during the charging and discharging.

It is to be noted that although the electrode D and the electrode E exhibited somewhat lowered discharge voltage as compared to the electrode A and the electrode B, improvement of the cycle life can be expected. This event is pertinent to suppression of generation of a locally overcharged region due to uniform charging of the entirety since the electric conductivity of the active material is improved by adding cobalt. In other words, it is believed that since generation of γ-NiOOH to be accompanied by significant expansion of the volume of the active material layer can be prevented, the cycle life can be particularly extended.

Next, in connection with the electrode A, results of measurement of the high rate dischargeability at 1 to 500 C-rate are shown in FIG. 15 and FIG. 16, whereas in connection with the electrode C', results of measurement of the high rate dischargeability at 1 to 10 C-rate in FIG. 16. Values in FIG. 15 indicate the discharging rate. The charging rate was 1 C, and charged up to 110% of the battery capacity (provided that one-electron reaction accounting for 100%). The cut-off voltage was 0.8 V. As a result, it was revealed that a high discharge voltage of 1.3 V was maintained even if discharge of 1 C-rate was executed. At a discharging rate of not less than 30 C-rate, the discharge voltage was gradually lowered; however, even in the case of 100 C-rate, a comparatively high voltage of 1.2 V equivalent to conventional platy electrodes was maintained. Thus, although discharge capacity of the electrode A decreased along with elevation of the discharging rate, discharge of 50% of the total capacity was enabled even at the 100 C rate. Although the electrode C' demonstrated in Comparative Example 3 was inferior to the electrode A in terms of the cycle life, 1,000 cycles were achieved. However, with regard to the high output characteristics of the electrode C', the discharging rate significantly decreased to not greater than 10% at 10 C. Accordingly, it is proven that the fibrous nickel positive electrode can achieve not only improved cycle life but also higher output characteristics as compared with conventional platy electrodes.

Figure 17:
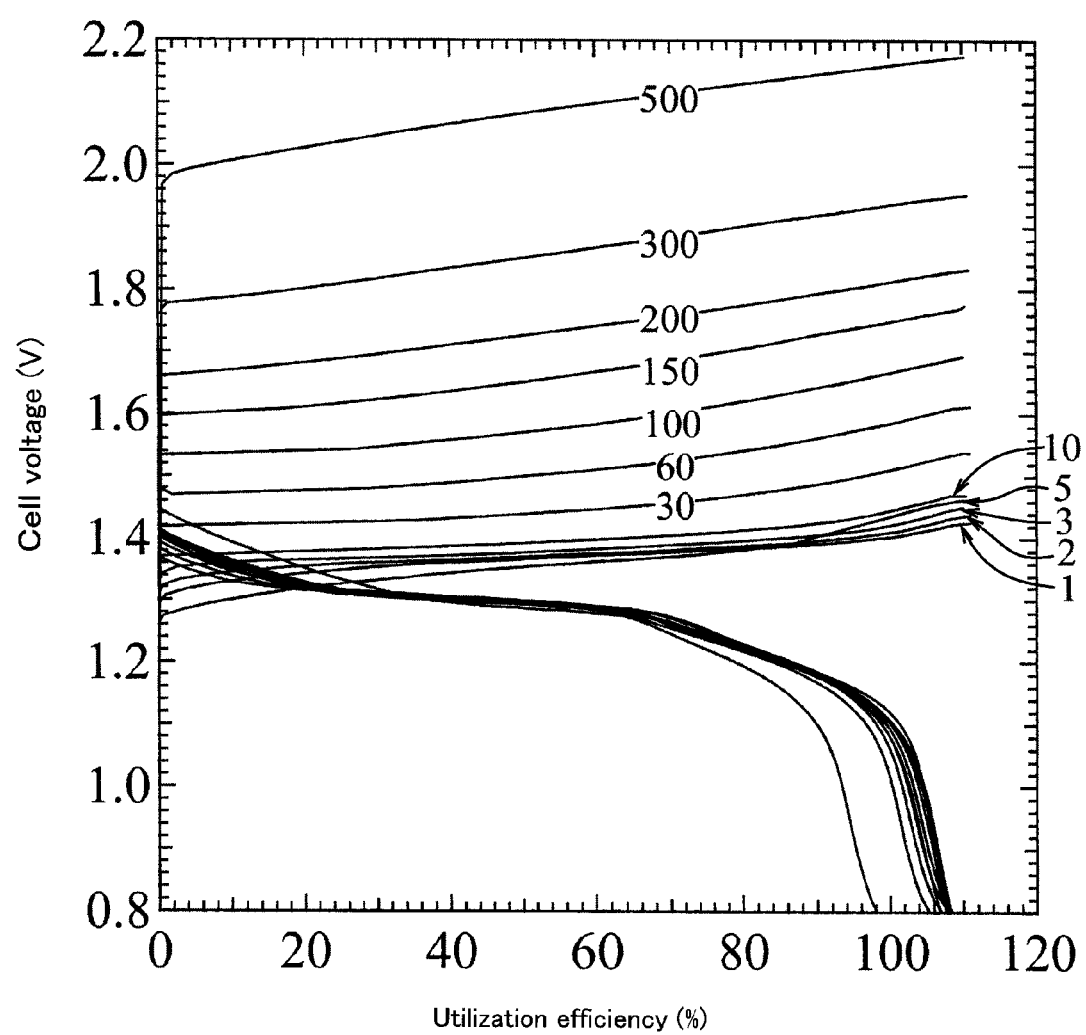
FIG. 17 shows a view illustrating a discharge curve at 1 C-rate after 110% charging at 1 to 500 C-rate for Example 1 (electrode A).

In addition, as shown in FIG. 17, the fibrous positive electrode A was also revealed to exhibit superior rapid charging characteristics. In this regard, an experiment was carried out using the electrode A, and the amount of charge was 110% of the battery capacity. After executing charging at each charging rate at 1 to 500 C-rate, the dischargeability of 1 C-rate was measured, and the cut-off voltage was 0.8 V. From FIG. 17, it is also revealed that even if rapidly charged at the 500 C rate, 100% discharge at the 1 C rate was possible. This charging characteristic may be referred to as involving in the scope of capacitors having a high capacity. Therefore, the present invention may be concluded as being suited also for capacitors not only for alkali secondary batteries.

Figure 19:
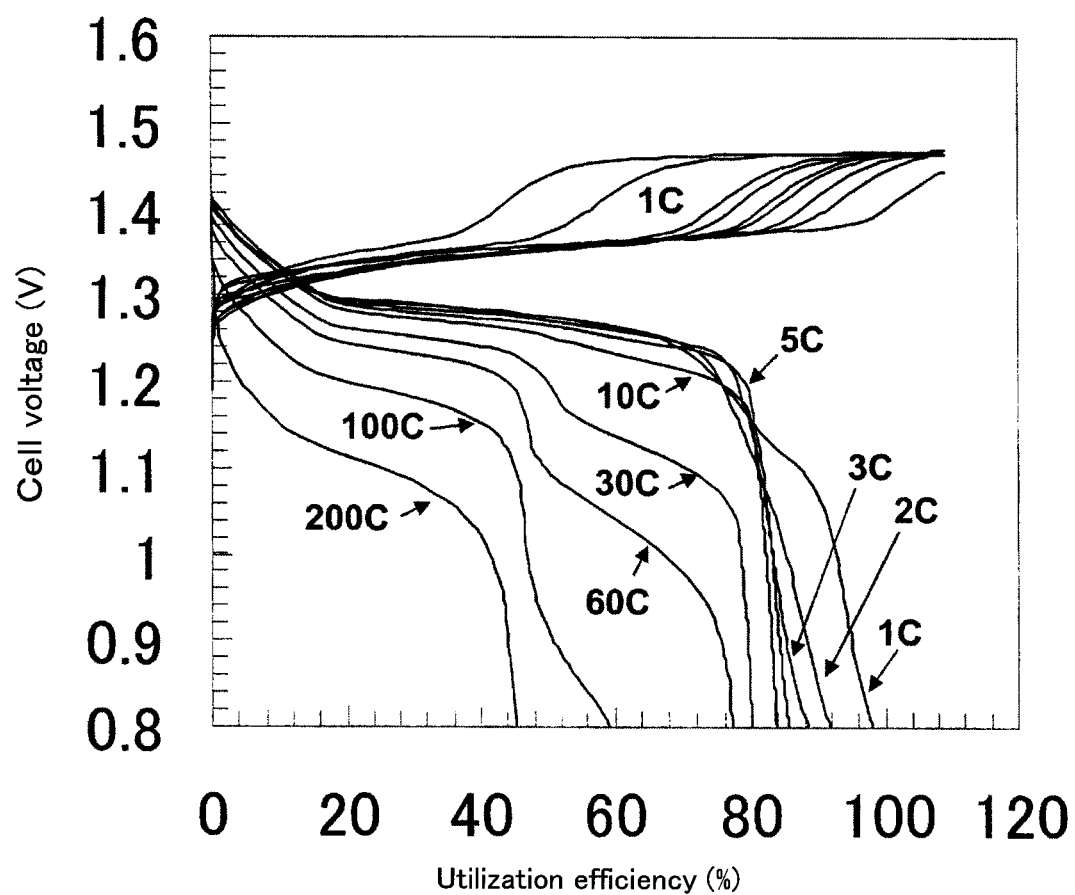
FIG. 19 shows a view illustrating a discharge curves at 1 to 200 C-rate after 110% charging at 1 C-rate for Example 3 (electrode C).

In connection with the electrode C of Example 3, results of measurement of the high rate dischargeability at 1 to 200 C-rate are shown in FIG. 19. The charging rate was 1 C rate, and charged up to 110% of the discharge capacity. The cut-off voltage was 0.8 V. As a result, it was revealed that a high discharge voltage of 1.3 V was maintained even if discharge at the rate was executed. As compared with the electrode A of Example 1, the discharge curve at 30 to 100 C-rate of the electrode C of Example 3 had two-phase plateau, and the first phase plateau was proven to maintain a high discharge voltage of 1.3 to 1.2 V. In particular, the discharge voltage of 1.2 V was maintained at 100 C-rate, and discharge of 60% of the total capacity was enabled, whereas also at 200 C-rate, the discharge voltage of 1.1 V was maintained, and discharge of 50% of the total capacity was enabled.

As described in the foregoing, it was ascertained that the nickel positive electrode for a fiber battery of the present invention exhibits extremely remarkable effects in connection with output characteristics and cycle life duration characteristics. In other words, the positive electrode characteristics suggest conspicuously superior effects which are not predictable by a person skilled in the art in view of disclosures in prior arts.

INDUSTRIAL APPLICABILITY

Accordingly, the nickel positive electrode for a fiber battery of the present invention described in detail above is fibrous, and alkali secondary batteries configured using this fibrous nickel positive electrode are employed for mobile use, transfer use, standby use and the like. In particular, the nickel positive electrode is superior as electric power supplies that require also a high output and high capacity in addition to a long life duration. Furthermore, designing a battery enabling rapid charging, for example, permitting 500 C-rate, which has not been conceivable in light of generally used secondary battery can be made, and thus it is extremely great industrial advantages can be achieved such as possibility of providing capacitors with high capacity, and the like.

REFERENCE SIGNS LIST

1a Monofilament
1b Flat Platy Substrate
2 Nickel Hydroxide Crystal
3a Nickel Hydroxide
3b Nickel Hydroxide
4 Aqueous Nickel Nitrate Solution
5 Cathode
6 Anode
7 Carbon Fiber
8 Metal Nickel
9 Nickel Hydroxide
10 Carbon Fiber

The invention claimed is:

1. A fiber nickel positive electrode comprising:
a carbon fiber; and
an active material layer of NiOOH disposed on the carbon fiber,
wherein the active material layer has a layered structure that consists of:
a first active material layer made of $\gamma$-NiOOH and disposed on the carbon fiber; and
a second active material layer made of $\beta$-NiOOH and disposed on the first active material layer.

2. The fiber nickel positive electrode according to claim 1, wherein a monofilament constituting the carbon fiber has a diameter of 5 to 100 μm.

3. The fiber nickel positive electrode according to claim 1, wherein the carbon fiber is formed as a bundle of 1,000 to 2,000 monofilaments.

4. The fiber nickel positive electrode according to claim 1, wherein the carbon fiber is formed as a bundle of 2 to 10 twisted monofilaments.

5. The fiber nickel positive electrode according to claim 1, wherein the carbon fiber has a nickel-plating layer thereon, the nickel-plating layer having a thickness of 0.5 to 15 μm.

6. A secondary battery comprising:
the fiber nickel positive electrode according to claim 1;
a negative electrode containing a hydrogen storage alloy;
an aqueous electrolyte; and
a separator.

* * * * *